(12) United States Patent
Rezaei Zare et al.

(10) Patent No.: US 11,887,774 B2
(45) Date of Patent: Jan. 30, 2024

(54) SYSTEM AND METHOD FOR DIFFERENTIAL PROTECTION UNDER GEOMAGNETICALLY INDUCED CURRENT

(71) Applicants: Afshin Rezaei Zare, Thornhill (CA); Babak Ahmadzadeh-Shooshtari, Toronto (CA)

(72) Inventors: Afshin Rezaei Zare, Thornhill (CA); Babak Ahmadzadeh-Shooshtari, Toronto (CA)

( * ) Notice: Subject to any disclaimer, the term of this patent is extended or adjusted under 35 U.S.C. 154(b) by 347 days.

(21) Appl. No.: 17/390,241

(22) Filed: Jul. 30, 2021

(65) Prior Publication Data

US 2022/0037084 A1   Feb. 3, 2022

Related U.S. Application Data

(60) Provisional application No. 63/059,581, filed on Jul. 31, 2020.

(51) Int. Cl.
*H01F 27/34* (2006.01)
*H02M 1/44* (2007.01)
(Continued)

(52) U.S. Cl.
CPC ............ *H01F 27/34* (2013.01); *H02H 3/16* (2013.01); *H02H 7/045* (2013.01); *H02M 1/44* (2013.01)

(58) Field of Classification Search
CPC .. H01F 27/00; H01F 27/33; H01F 27/34–385; H02H 3/00; H02H 3/16–17;
(Continued)

(56) References Cited

U.S. PATENT DOCUMENTS

| 4,661,877 A | * | 4/1987 | Usui | H02H 7/045 |
| | | | | 361/60 |
| 6,341,055 B1 | * | 1/2002 | Guzman-Casillas | H02H 3/283 |
| | | | | 361/87 |

(Continued)

OTHER PUBLICATIONS

"Geomagnetic Disturbances: Their Impact on the Power Grid," IEEE Power & Energy Magazine, vol. 11, No. 4, pp. 71-78, Jul.-Aug. 2013.
(Continued)

*Primary Examiner* — Scott Bauer
*Assistant Examiner* — Carlos O Rivera-Perez
(74) *Attorney, Agent, or Firm* — Bhole IP Law; Anil Bhole; Marc Lampert

(57) ABSTRACT

A system and method for differential protection of a transformer under geomagnetically induced current (GIC). The method including: receiving differential currents associated with the transformer; outputting a high GIC signal where second harmonic phasors of the differential currents are in a negative-sequence format and at least one magnitude of the second harmonic phasors is greater than a magnitude threshold, or waveforms of three phases of the differential currents are all asymmetrical in a positive or negative direction; determining derivatives of the differential currents of three phases of the transformer; outputting a high supplementary signal where at least one of the derivatives of the differential currents is greater than a supplementary threshold; combining the GIC signal with the supplementary signal; combining the supplemented GIC signal with a second harmonic blocking signal; and outputting a trip signal for electrically tripping the transformer based on a supplemented second harmonic blocking signal.

20 Claims, 26 Drawing Sheets

(51) Int. Cl.
   *H02H 7/045* (2006.01)
   *H02H 3/16* (2006.01)
(58) Field of Classification Search
   CPC ............ H02H 3/26; H02H 3/265; H02H 3/28;
         H02H 3/283; H02H 3/305; H02H 7/00;
         H02H 7/04–055; H02H 5/00; H02H
         5/005; H02M 1/00; H02M 1/0003; H02M
         1/0009; H02M 1/0025; H02M 1/32;
         H02M 1/44
   USPC .... 361/35, 36, 38–50, 78, 79, 87, 93.1–102;
         363/50, 51; 323/266, 271–277, 280,
         323/282–285, 351
   See application file for complete search history.

(56) References Cited

U.S. PATENT DOCUMENTS

2013/0285671 A1* 10/2013 Hoffman ................ G01R 31/62
                                                       324/547
2020/0106262 A1   4/2020 Anderson et al.

OTHER PUBLICATIONS

"IEEE Standard for Metal-Clad Switchgear," IEEE Std C37.20.2-2015 (revision of IEEE Std C37.20.2-1999), pp. 1-94, 2015.
"IEEE Standard Requirements for Instrument Transformers," IEEE Std C57.13-2016 (Revision of IEEE Std C57.13-2008), pp. 1-96, Jun. 2016.
"Transmission System Planned Performance for Geomagnetic Disturbance Events," NERC Std TPL-007-4, pp. 1-38, 2020.
A. Giuliante and G. Clough, "Advances in the Design of Differential Protection for Power Transformers," Georgia Tech. Protective Relaying Conf., Atlanta, GA, 1991, pp. 1-12.
A. Guzm'an, H.J. Altuve, G. Benmouyal, "Power transformer protection,", in: Electric Power Transformer Engineering, 2nd ed., 18, CRC Press, Boca Raton, 2007, pp. 410-437, sec. 2.
A. Guzmán, H. J. Altuve, and G. Benmouyal, "Power Transformer Protection," in Electric Power Transformer Engineering, 2nd ed. Boca Raton: CRC Press, 2007, ch. 18, sec. 2, pp. 410-437.
A. Guzman, S. Zocholl, G. Benmouyal, and H. J. Altuve, "A Current-Based Solution for Transformer Differential Protection—Part II: Relay Description and Evaluation," IEEE Trans. Power Del., vol. 17, No. 4, pp. 886-893, Oct. 2002.
A. Haddadi, A. Rezaei-Zare, L. G'erin-Lajoie, R. Hassani, J. Mahseredjian, A modified IEEE 118-bus test case for geomagnetic disturbance studies—part i: model data,, IEEE Trans. Electromagn. Compat. (2019) 1-11.
A. Pulkkinen, S. Lindahl, A. Viljanen, R. Pirjola, "Geomagnetic storm of Oct. 29-31, 2003: geomagnetically induced currents and their relation to problems in the Swedish high-voltage power transmission system,", Space Weather 3 (8) (2005) 1-19.
A. Rezaei-Zare and A. H. Etemadi, "Optimal Placement of GIC Blocking Devices Considering Equipment Thermal Limits and Power System Operation Constraints," IEEE Trans. Power Del., vol. 33, No. 1, pp. 200-208, Feb. 2018.
A. Rezaei-Zare, "Enhanced Transformer Model for Low- and Mid-Frequency Transients—Part I: Model Development," EEE Trans. Power Del., vol. 30, No. 1, pp. 307-315, Feb. 2015.
A. Rezaei-Zare, "Enhanced transformer model for low- and mid-frequency transients—Part II: Validation and simulation results," IEEE Trans. Power Del., vol. 30, No. 1, pp. 316-325, Feb. 2015.
A. Rezaei-Zare, A.H. Etemadi, "Optimal placement of GIC blocking devices considering equipment thermal limits and power system operation constraints,", IEEE Trans. Power Del. 33 (1) (2018) 200-208.
A. Rezaei-Zare, L. Marti, A. Narang, A. Yan, "Analysis of three-phase transformer response due to GIC using an advanced duality-based model,", IEEE Trans. Power Del. 31 (5) (2016) 2342-2350.
A. Rezaei-Zare, L. Marti, A. Narang, and A. Yan, "Analysis of Three-Phase transformer Response due to GIC Using an Advanced Duality-Based Model," IEEE Trans. Power Del., vol. 31, No. 5, pp. 2342-2350, Oct. 2016.
A.H. Etemadi, A. Rezaei-Zare, "Optimal placement of GIC blocking devices for geomagnetic disturbance mitigation,", IEEE Trans. Power Syst. 29 (6) (2014) 2753-2762.
B. Ahmadzadeh-Shooshtari and A. Rezaei-Zare, "Advanced transformer differential protection under GIC conditions," Trans. Power Del., Early Access, Jun. 2021.
B. Ahmadzadeh-Shooshtari and A. Rezaei-Zare, "Analysis of Transformer Differential Protection Performance under Geomagnetically Induced Current Conditions," Electr. Power Syst. Research, vol. 194, pp. 1-8, May 2021.
B. Kasztenny, et al. "Do CTs like DC? Performance of current transformers with geomagnetically induced currents,", in: Proceedings of the 69th Annual Conference on Protective Relay Engineers (CPRE), College Station, TX, 2016, pp. 1-17.
B. Kasztenny, N. Fischer, D. Taylor, T. Prakash, and J. Jalli, "Do CTs like DC? Performance of Current Transformers with Geomagnetically Induced Currents," 2016 69th Annual Conf. Protective Relay Engineers (CPRE), College Station, TX, 2016, pp. 1-17.
Current Differential and Voltage Protection Relay, Schweitzer Engineering Laboratories, Pullman, WA, USA, Tech. Rep. SEL-387E, 2002.
E. E. Bernabeu, "Single-Phase Transformer Harmonics Produced During Geomagnetic Disturbances: Theory, Modeling, and Monitoring," IEEE Trans. Power Del., vol. 30, No. 3, pp. 1323-1330, Jun. 2015.
E.C. Segatto, D.V. Coury, "A differential relay for power transformers using intelligent tools,", IEEE Trans. Power Syst. 21 (3) (2006) 1154-1162.
E.E. Bernabeu, "Single-phase transformer harmonics produced during geomagnetic disturbances: theory, modeling, and monitoring,", IEEE Trans. Power Del. 30 (3) (2015) 1323-1330.
H. Weng, X. Lin, "Studies on the unusual maloperation of transformer differential protection during the nonlinear load switch-in,", IEEE Trans. Power Del. 24 (4) (2009) 1824-1831.
H. Weng, X. Lin, and P. Liu, "Studies on the Operation Behavior of Differential Protection During a Loaded Transformer Energization," IEEE Trans. Power Del., vol. 22, No. 3, pp. 1386-1391, Jul. 2007.
IEEE Standard Requirements for Instrument Transformers, IEEE Standard C57.13-2016 (Revision of IEEE Standard C57.13-2008), pp. 1-96, Jun. 2016.
J. G. Kappenman, V. D. Albertson, and N. Mohan, "Current Transformer and Relay Performance in the Presence of Geomagnetically-Induced Currents," IEEE Trans. Power App. Syst., vol. PAS-100, No. 3, pp. 1078-1088, Mar. 1981.
J.A. Sykes, I.F. Morrison, "A proposed method of harmonic restraint differential protecting of transformers by digital computer,", IEEE Trans. Power App. Syst. (3) (1972) 1266-1272. PAS-91.
J.G. Kappenman, V.D. Albertson, N. Mohan, "Current transformer and relay performance in the presence of geomagnetically-induced currents,", IEEE Trans. Power App. Syst. (3) (1981) 1078-1088. PAS-100.
J.G. Kappernman, V.D. Albertson, "Bracing for the geomagnetic storms,", IEEE Spectr. 27 (3) (1990) 27-33.
K. Behrendt, N. Fischer, and C. Labuschagne, "Considerations for Using Harmonic Blocking and Harmonic Restraint Techniques on Transformer Differential Relays," 33rd Annual Western Protective Relay Conf., Spokane, Washington, 2006, pp. 1-17.
K. Zheng et al., "Effects of System Characteristics on Geomagnetically Induced Currents," IEEE Trans. Power Del., vol. 29, No. 2, pp. 890-898, Apr. 2014.
L. Marti and C. Yiu, "Real-time management of geomagnetic disturbances: Hydro One's eXtreme space weather control room tools.," IEEE Electrific. Magazine, vol. 3, No. 4, pp. 46-51, Dec. 2015.
L. Marti, A. Rezaei-Zare, and A. Yan, "Modelling considerations for the Hydro One real-time GMD management system," 2013 IEEE Power & Energy Society General Meeting Conf., Vancouver, BC, 2013, pp. 1-6.

(56) References Cited

OTHER PUBLICATIONS

M. Kazerooni, H. Zhu, T.J. Overbye, "Improved modeling of geomagnetically induced currents utilizing derivation techniques for substation grounding resistance,", IEEE Trans. Power Del. 32 (5) (2017) 2320-2328.

P. Liu, O.P. Malik, D. Chen, G.S. Hope, Y. Guo, "Improved operation of differential protection of power transformers for internal faults,", IEEE Trans. Power Del. 7 (4) (1992) 1912-1919.

R. Fan, Y. Liu, A. Umana, Z. Tan, L. Sun, and Y. An, "The Impact of Solar Storms on Protective Relays for Saturable-Core Transformers," 2017 IEEE Power & Energy Society General Meeting, Chicago, IL, 2017, pp. 1-5.

R. Hamilton, "Analysis of Transformer Inrush Current and Comparison of Harmonic Restraint Methods in Transformer Protection," IEEE Trans. Ind Appl., vol. 49, No. 4, pp. 1890-1899, Jul.-Aug. 2013.

R. Hamilton, "Analysis of transformer inrush current and comparison of harmonic restraint methods in transformer protection,", IEEE Trans. Ind Appl. 49 (4) (2013) 1890-1899.

R. L. Lesher, J. W. Porter, and R. T. Byerly, "Sunburst—A Network of GIC Monitoring Systems," IEEE Trans. Power Del., vol. 9, No. 1, pp. 128-137, Jan. 1994.

R. Sun, M. McVey, M. Lamb, and R. M. Gardner, "Mitigating geomagnetic disturbances: A summary of Dominion Virginia Power's efforts," IEEE Electrific. Magazine, vol. 3, No. 4, pp. 34-45, Dec. 2015.

R. Sun, M. McVey, M. Lamb, R.M. Gardner, Mitigating geomagnetic disturbances: a summary of dominion Virginia power's efforts. IEEE Electrific. Mag. 3 (4) (2015) 34-45.

S. Bagheri, et al., "Effect of Transformer Winding Mechanical Defects, Internal and External Electrical Faults and Inrush Currents on Performance of Differential Protection," IET Gener. Transm. Distrib., vol. 11, No. 10, pp. 2508-2520, Jul. 2017.

S. Biswas, R. N. Dash, K. Choudhury, and S. P. Sahoo, "A Review Paper on Inrush Fault Isolation Methods of A Three-Phase Transformer," 2018 Technol. Smart-City Energy Security and Power (ICSESP), Bhubaneswar, 2018, pp. 1-5.

S.M. Saad, A. Elhaffar, K. El-Arroudi, "Optimizing differential protection settings for power transformers,", in: Proceedings of the Modern Electric Power Systems (MEPS), Wroclaw, 2015, pp. 1-6.

SEL-387E, Current Differential and Voltage Protection Relay, Schweitzer Engineering Laboratories Inc., Pullman, WA, 2002.

T. H. Breckenridge, T. Cumming, and J. Merron, "Geomagnetic Induced Current Detection and Monitoring," 2001 7th Int. Conf. Devel. Power Syst. Protection (IEE), Amsterdam, Netherlands, 2001, pp. 250-253.

T. Zheng, P. Chen, T. Lu, Y. Jin, L. Liu, "Effects of geomagnetically induced currents on current transformer and differential protection,", in: Proceedings of the IEEE Power Energy Society General Meeting, Vancouver, BC, 2013, pp. 1-5.

V. D. Albertson et al., "Geomagnetic disturbance effects on power systems," IEEE Trans. Power Del., vol. 8, No. 3, pp. 1206-1216, Jul. 1993.

X. Lin, H. Weng, P. Liu, B. Wang, Z. Bo, "Analysis of a sort of unusual mal-operation of transformer differential protection due to removal of external fault,", IEEE Trans. Power Del. 23 (3) (2008) 1374-1379.

X. Qi, X. Yin, Z. Zhang, D. Chen, Y. Wang, and F. Cai, "Study on the Unusual Misoperation of Differential Protection During Transformer Energization and its Countermeasure," IEEE Trans. Power Del., vol. 31, No. 5, pp. 1998-2007, Oct. 2016.

Y. Zhao and P. Crossley, "Countermeasure to Prevent the Incorrect Blocking of Differential Protection Applied to Converter Transformers," IEEE Trans. Power Del., vol. 35, No. 1, pp. 95-105, Feb. 2020.

Y. Zhao and P. Crossley, "Impact of DC Bias on Differential Protection of Converter Transformers," Int. J. Electr. Power & Energy Syst., vol. 115, pp. 1-10, Feb. 2020.

Y. Zhao, P.A. Crossley, T. David, "Impact of DC bias on operating performance of current transformers,", J. Eng. 2018 (15) (2018) 930-934.

\* cited by examiner

SYSTEM AND METHOD FOR DIFFERENTIAL PROTECTION UNDER GEOMAGNETICALLY INDUCED CURRENT

TECHNICAL FIELD

The following relates generally to protection of electric power components; and more specifically, to a system and method for differential protection under geomagnetically induced current.

BACKGROUND

Geomagnetic disturbance (GMD) is a temporary fluctuation in the earth's magnetic field due to a solar storm, which results in the flow of geomagnetically induced current (GIC) in the power system, transmission lines, and transformers with the grounded neutrals. Half-cycle saturation due to the GIC with low frequency, within the range of 0.1 mHz-0.1 Hz, contributes to the power system harmonic currents, thermal stress on the transformers, and an increase in the reactive power consumption of the transformers. This current can also cause power system stability and protection concerns.

SUMMARY

In an aspect, there is provided a method for differential protection of a transformer under geomagnetically induced current (GIC), the method comprising: receiving differential currents associated with the transformer; outputting a high GIC signal where second harmonic phasors of the differential currents are in a negative-sequence format and at least one magnitude of the second harmonic phasors is greater than a magnitude threshold, or waveforms of three phases of the differential currents are all asymmetrical in either positive or negative direction with the high magnitude portion higher than a pre-specified value, otherwise outputting a low GIC signal; determining derivatives of the differential currents of three phases of the transformer; outputting a high supplementary signal where at least one of the derivatives of the differential currents is greater than a supplementary threshold, otherwise outputting a low supplementary signal; combining the GIC signal with the supplementary signal using NAND logic to determine a supplemented GIC signal; combining the supplemented GIC signal with a second harmonic blocking signal using AND logic to determine a supplemented second harmonic blocking signal; and outputting a trip signal for electrically tripping the transformer based on the supplemented second harmonic blocking signal.

In a particular case of the method, receiving the differential currents associated with the transformer comprises receiving second harmonic phasors of the differential currents associated with the transformer.

In another case of the method, determining whether the second harmonic phasors of the differential currents are in the negative-sequence format comprises determining phase angles of the second harmonic phasors of the differential currents.

In yet another case of the method, the phase angles are passed through a low pass filter.

In yet another case of the method, determining the derivatives of the differential currents of three phases of the transformer comprises determining magnitudes of the differential currents with a fundamental frequency and determining rates of change of the differential currents.

In yet another case of the method, the derivatives of the differential currents are passed through low pass filters.

In yet another case of the method, combining the supplemented GIC signal with the second harmonic blocking signal using AND logic to determine the supplemented second harmonic blocking signal comprises: determining a ratio of the second harmonic to a first harmonic component of the differential current for each phase, and outputting a high second harmonic blocking signal where the determined ratio is greater than a predetermined second harmonic threshold, the first harmonic component comprising a fundamental frequency; combining the second harmonic blocking signal with the supplemented GIC signal using AND logic to output a supplemented second harmonic blocking signal; and combining a trip request signal with the supplemented second harmonic blocking signal using AND logic to output the trip signal for electrically tripping the transformer.

In yet another case of the method, the trip request signal is determined by determining whether the differential current related to any phase is greater than a predetermined current value, and outputting high for the trip request signal when the differential current related to any phase is greater than the predetermined current value, otherwise, outputting low.

In yet another case of the method, the predetermined current value is determined based on a restraint current of a given phase or a based on a predetermined unrestrained current threshold.

In yet another case of the method, outputting high for the trip request signal comprises outputting high for the trip request signal after a given time delay.

In another aspect, there is provided a system for differential protection of a transformer under geomagnetically induced current (GIC), the system comprising electrical circuitry to execute: a harmonic-based GIC detection module to receive differential currents associated with the transformer, and output a high GIC signal where second harmonic phasors of the differential currents are in a negative-sequence format and at least one magnitude of the second harmonic phasors is greater than a magnitude threshold, or waveforms of three phases of the differential currents are all asymmetrical in a positive or negative direction, otherwise outputting a low GIC signal; a supplementary module to determine derivatives of the differential currents of three phases of the transformer, output a high supplementary signal where at least one of the derivatives of the differential currents is greater than a supplementary threshold, otherwise outputting a low supplementary signal, and combine the GIC signal with the supplementary signal using NAND logic to determine a supplemented GIC signal; a second harmonic blocking module to combine the supplemented GIC signal with a second harmonic blocking signal using AND logic to determine a supplemented second harmonic blocking signal; and a trip request module to output a trip signal for electrically tripping the transformer based on the supplemented second harmonic blocking signal.

In a particular case of the system, receiving the differential currents associated with the transformer comprises receiving second harmonic phasors of the differential currents associated with the transformer.

In another case of the system, determining whether the second harmonic phasors of the differential currents are in the negative-sequence format comprises determining phase angles of the second harmonic phasors of the differential currents.

In yet another case of the system, the phase angles are passed through a low pass filter.

In yet another case of the system, determining the derivatives of the differential currents of three phases of the transformer comprises determining magnitudes of the differential currents with a fundamental frequency and determining rates of change of the differential currents.

In yet another case of the system, the derivatives of the differential currents are passed through low pass filters.

In yet another case of the system, combining the supplemented GIC signal with the second harmonic blocking signal using AND logic to determine the supplemented second harmonic blocking signal comprises: determining a ratio of the second harmonic to a first harmonic component of the differential current for each phase, and outputting a high second harmonic blocking signal where the determined ratio is greater than a predetermined second harmonic threshold, the first harmonic component comprising a fundamental frequency; combining the second harmonic blocking signal with the supplemented GIC signal using AND logic to output a supplemented second harmonic blocking signal; and combining a trip request signal with the supplemented second harmonic blocking signal using AND logic to output the trip signal for electrically tripping the transformer.

In yet another case of the system, the trip request signal is determined by determining whether the differential current related to any phase is greater than a predetermined current value, and outputting high for the trip request signal when the differential current related to any phase is greater than the predetermined current value, otherwise, outputting low.

In yet another case of the system, the predetermined current value is determined based on a restraint current of a given phase or a based on a predetermined unrestrained current threshold.

In yet another case of the system, the system further comprising electrical circuitry to execute a trip module to electrically trip the transformer where the trip signal is high.

These and other aspects are contemplated and described herein. It will be appreciated that the foregoing summary sets out representative aspects of embodiments to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
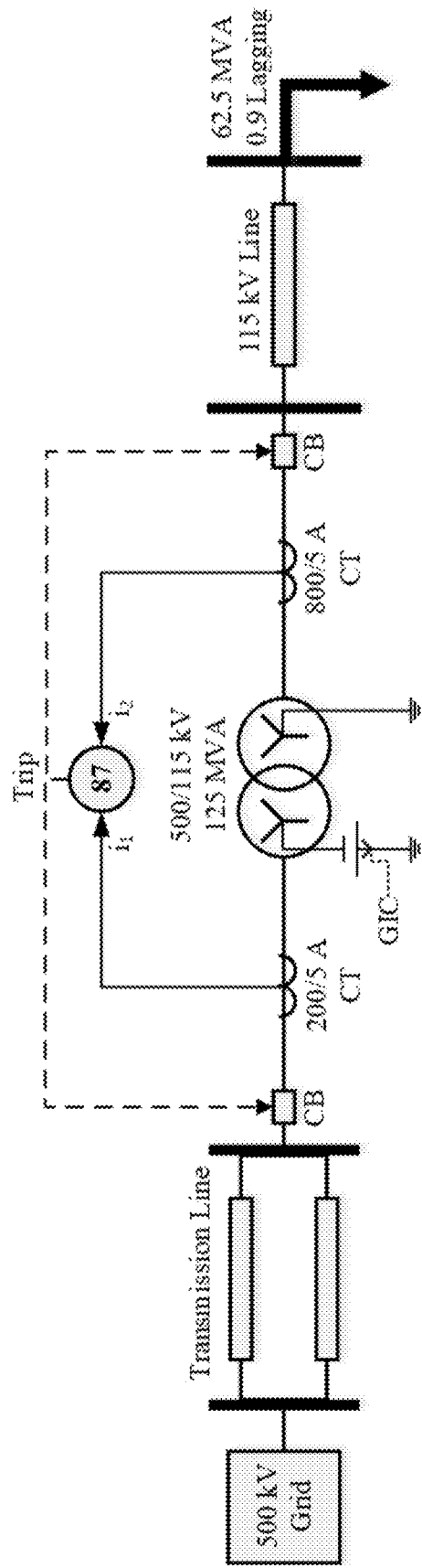
FIG. 1 illustrates a single-line diagram of an example system studied by the present inventors.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to protection of electric power components; and more specifically, to a system, method, and electrical circuit for differential protection under geomagnetically induced current.

Geomagnetically induced current (GIC) has been determined by the present inventors to have a significant effect on performance of electrical transformer differential protection during internal short-circuit faults. The GIC specifically causes a significant increase in the magnitudes of the second harmonic components of the transformer primary and secondary currents, and as a result, in the differential current monitored by a differential relay. This type of relay can be inhibited from sending the trip signal to the transformer circuit breakers (CBs) if the second harmonic level in the differential current exceeds a pre-specified threshold. This property is typically adopted in the relay to prevent the relay malfunction during the transformer energization; however, in these conditions, the relay may be incapable of interrupting an internal short-circuit fault. Therefore, the present embodiments provide a transformer differential relay with a second harmonic blocking property, for different types of internal short-circuit faults, when the GIC exists in the power system. Relay mal-operation conditions, if not addressed, can cause significant damage to the transformer and endanger the power system resilience and reliability.

In an example, the present inventors studied an electrical system, a single-line diagram of which is illustrated in FIG. 1. In the example system of FIG. 1, equipment to be protected is a 125 MVA, 500/115 kV three-phase transformer connecting a 500 kV transmission grid to a 115 kV sub-transmission network. The transformer is supplied from a double-circuit 500 kV transmission line with the length of 100 km, and energizes a short 115 kV line supplying a load at its remote end. In the high voltage transmission systems, the power systems should be effectively grounded, thus the windings connection of the transformer under study is assumed to be grounded wye on both sides.

As depicted in FIG. 1, the GIC flowing into the transformer is simulated by applying a dc voltage source at the neutral point of the transformer on the 500 kV side. While GIC is not a pure dc current, its variation is such slow that it can be assumed as pure dc compared with the power frequency and fault transients. Furthermore, the magnitude of the voltage source is adjusted to generate the GIC of 200 A flowing from the transformer neutral to the ground, as a reference GIC magnitude used in the example study.

Figure 2:
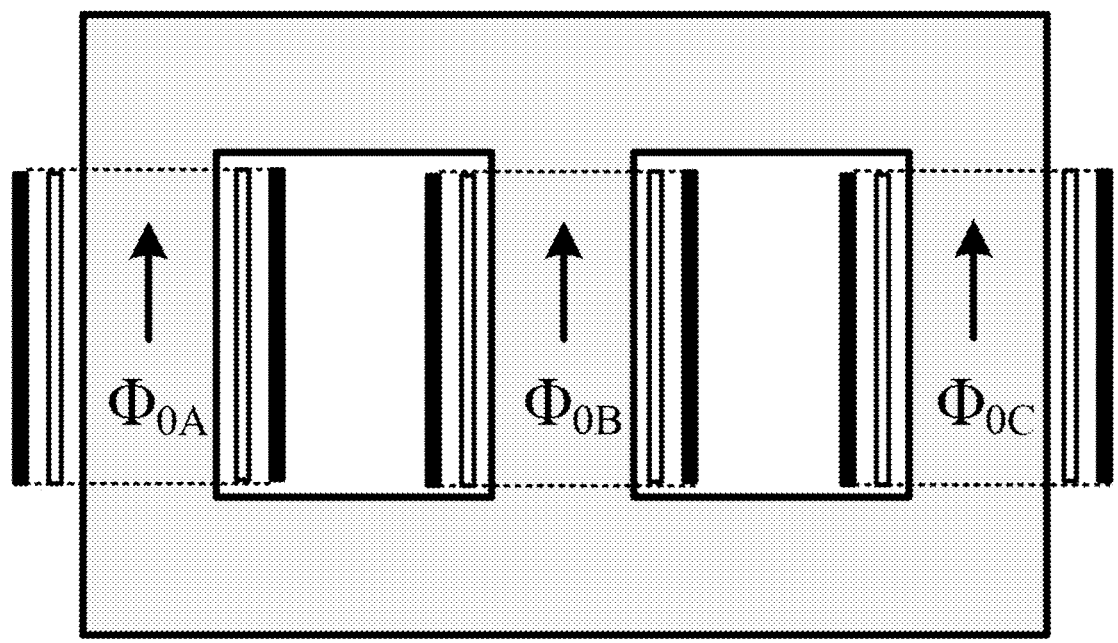
FIG. 2 illustrates a diagram of core construction of an example 3-leg transformer with the zero-sequence fluxes due to geomagnetically induced current (GIC)

For determining GIC related phenomena in transformers, the transformer model should be able to precisely represent the magnetic circuit of the transformer and coupling among the phases. Furthermore, it should be accurate enough in representing the saturation and off-core fluxes in the transformer, during the core dc bias due to GIC. A widely used construction of the three-phase transformers is 3-leg core; an example of which is depicted in FIG. 2. The behavior of this transformer under GIC conditions is such that the three-phase zero-sequence quasi-dc fluxes produced by GIC, denoted by $\phi_{0A}$, $\phi_{0B}$, and $\phi_{0C}$ in FIG. 2, close their paths through the air and link with the transformer tank. Therefore, it is beneficial for the transformer model to include a precise off-core flux representation.

Figure 3:
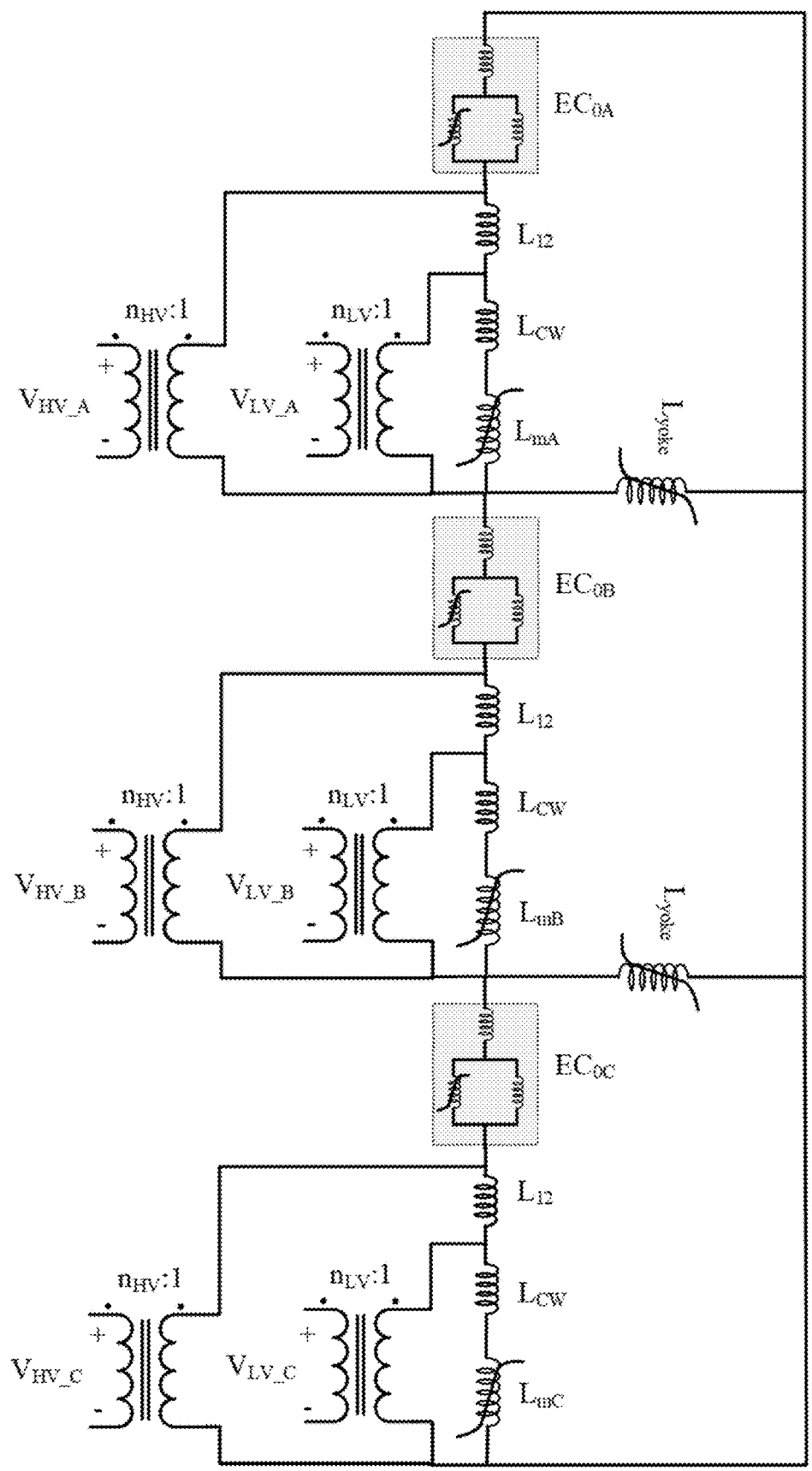
FIG. 3 illustrates a diagram of an example of duality-based equivalent circuit of the 3-leg core form transformer.

Based on the principle of duality, the equivalent circuit of the transformer can be derived as shown in FIG. 3. In FIG. 3, the saturable inductances $L_{mA}$, $L_{mB}$, and $L_{mC}$ represent the three-phase main legs. The top and bottom parts of the yokes between the two adjacent legs (FIG. 2) are represented by $L_{yoke}$. The tank and air-gap effects are modeled by zero-sequence equivalent circuits, i.e. $EC_{0A}$, $EC_{0B}$, and $EC_{0C}$. To interface the magnetic circuit equivalent of the transformer with the windings and the electric circuit and the power grid, ideal transformers are utilized, as shown in FIG. 3. $V_{HV}$ and $V_{LV}$ denote the HV and LV windings terminals, and $n_{HV}$ and $n_{LV}$ are the HV and LV turns ratios, respectively. The parameters, $L_{12}$ and $L_{CW}$, are the short-circuit inductance and the air-path inductance between each main leg and the associated LV winding, respectively.

Figure 4:
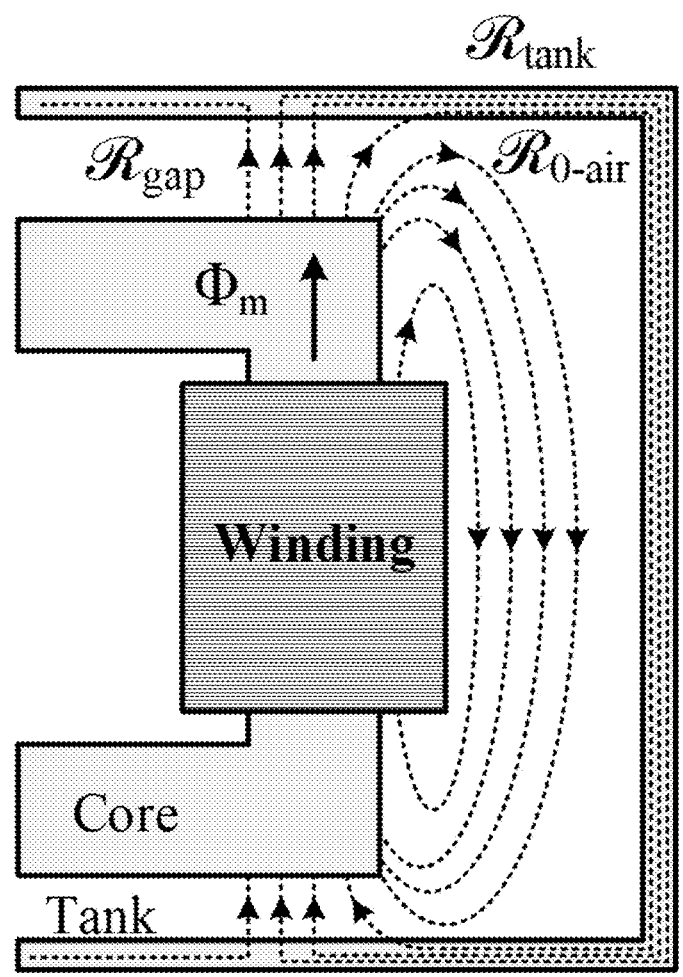
FIG. 4 illustrates a diagram of an example of off-core paths for zero-sequence flux.

When GMD happens, the quasi-dc voltages induced on the three-phase conductors of the transmission lines are identical. As a result, the magnitudes of GICs in all phases are the same and they appear as slow varying zero-sequence currents in the transformer windings. These currents generate zero-sequence magnetomotive force (mmf) and fluxes in the core. Each zero-sequence flux shown in FIG. 2 exits the core and close its path through the surrounding air path and the transformer tank, as illustrated in FIG. 4. The GIC also leads to the core saturation and ac flux linked with the tank. In FIG. 4, $\mathcal{R}_{gap}$, $\mathcal{R}_{tank}$, and $\mathcal{R}_{0\text{-}air}$ are the reluctances of the air-gap between the core and the tank, the transformer tank, and the winding surrounding air, respectively. The flux $\Phi_m$ is the main leg magnetizing flux.

Figure 5B:
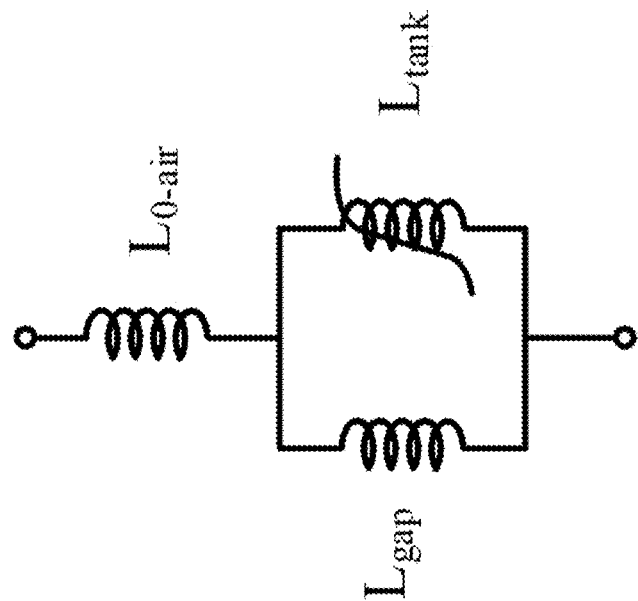
FIG. 5B illustrates a diagram of an example of an equivalent dual electric circuit for the off-core fluxes in transformers.
Figure 5A:
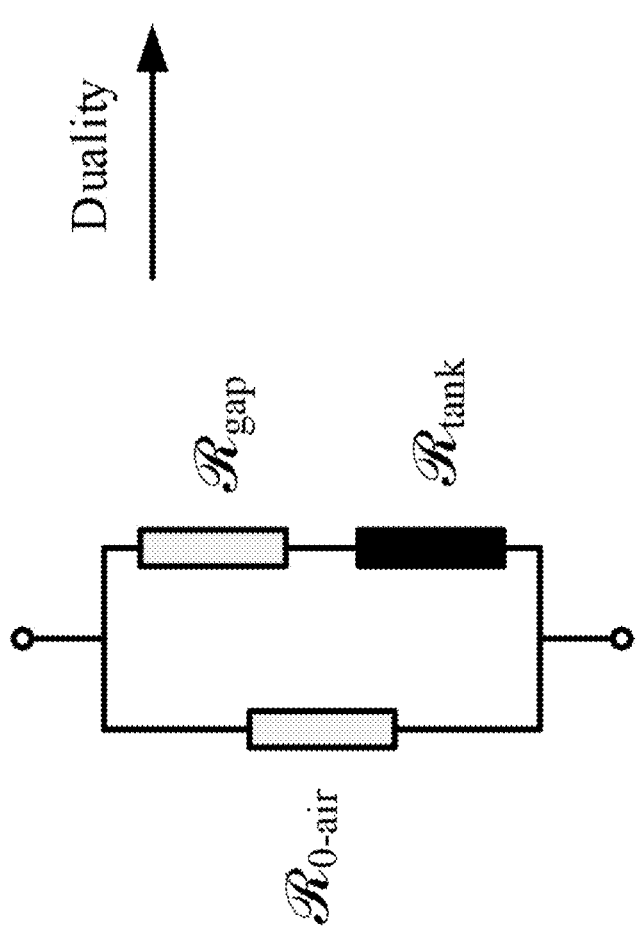
FIG. 5A illustrates a diagram of an example of an equivalent magnetic circuit for the off-core fluxes in transformers.

FIG. 5A shows the equivalent magnetic circuit of the off-core flux paths, illustrated in FIG. 4. Using the principle of duality, the equivalent electric circuit of this magnetic circuit is obtained as shown in FIG. 5B, which is also the same as $EC_{0A}$, $EC_{0B}$, and $EC_{0C}$ in FIG. 3. In FIG. 5B, $L_{gap}$, $L_{tank}$, and $L_{0\text{-}air}$ are the inductances corresponding to $\mathcal{R}_{gap}$, $\mathcal{R}_{tank}$, and $\mathcal{R}_{0\text{-}air}$, respectively.

Figure 6:
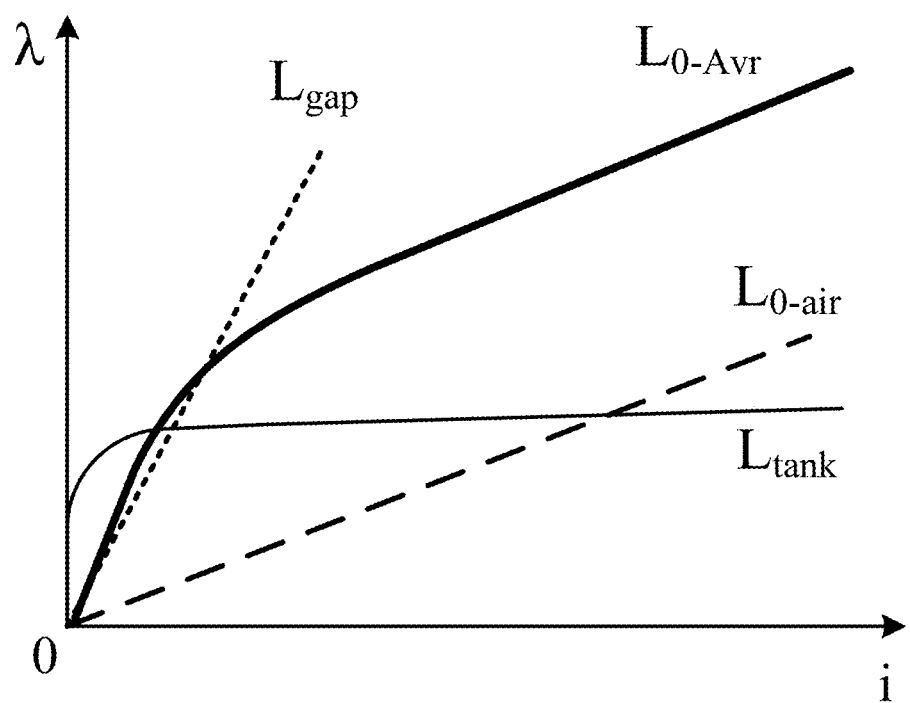
FIG. 6 illustrates a chart of magnetization characteristics of the equivalent off-core flux circuit of FIG. 5B.

The dc magnetization characteristics of the electric circuit of FIG. 5B are shown in FIG. 6. In this figure, $L_{0\text{-}Avr}$ is the final form of the transformer zero-sequence characteristic which results from the characteristics of inductances $L_{gap}$, $L_{tank}$, and $L_{0\text{-}air}$. Although all these three parameters are important, $L_{gap}$ is generally the most crucial one. $L_{gap}$ typically ranges from 0.9 pu to a large value such as 20 pu and more in large power transformers.

An example of differential relay (87) connections for transformer protection against short-circuit faults are shown in FIG. 1. The 200/5 A and 800/5 A current-transformers (CTs) scale down the primary and secondary three-phase currents of the transformer, respectively, so that they can be utilized by the relay. Furthermore, the trip signal is sent to both the high-voltage (HV) and low-voltage (LV) circuit-breakers (CBs) if an internal fault occurrence is detected and the relay is not blocked due to the corresponding second harmonic blocking.

Figure 7:
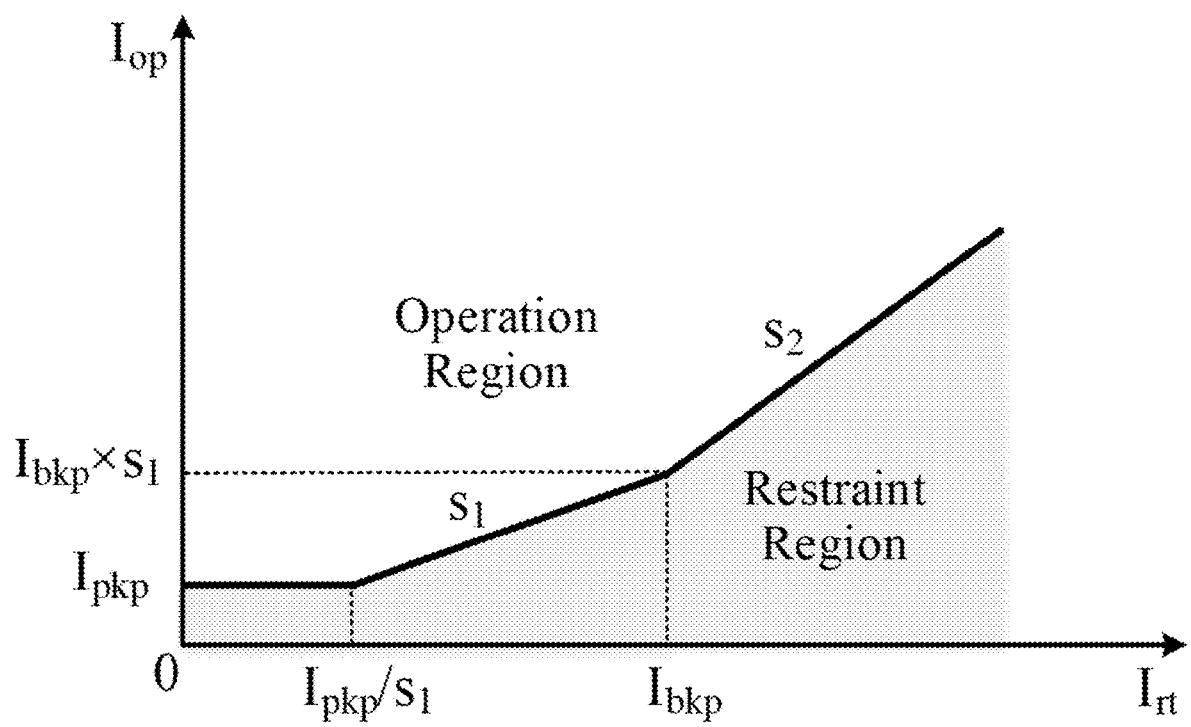
FIG. 7 illustrates a chart showing an example of differential relay operation-restraint characteristic.

The operation-restraint characteristic of the differential relay employed in this example study is dual-slope, which is shown in FIG. 7. The vertical axis is the operation/differential current $I_{op}=|\bar{I}_1+\bar{I}_2|$. $\bar{I}_1$ and $\bar{I}_2$ are the phasor values (with the fundamental frequency) related to the transformer primary and secondary currents of each phase, respectively. The horizontal axis is the restraint current $I_{rt}=|\bar{I}_1|+|\bar{I}_2|$. It should be noted that $I_{op}$ and $I_{rt}$ are calculated for all three phases. Considering FIG. 7, the characteristic slope changes from $s_1$ to $s_2$ as $I_{rt}$ becomes larger than the breakpoint current, $I_{bkp}$.

For each phase, if the point $(I_{rt}, I_{op})$ is located in the operation region, i.e., $I_{op}$ is higher than RES, a request for opening the HV and LV CBs of the transformer is made with an adjustable time delay, referred to as trip request delay (TRD). On the contrary, no trip request is issued if $I_{op}$ is smaller than or equal to RES. In the following equation, $I_{pkp}$, is the pickup current:

$$RES = \begin{cases} I_{pkp} & 0 \leq I_{rt} < \frac{I_{bkp}}{s_1} \\ I_{rt} \times s_1 & \frac{I_{bkp}}{s_1} \leq I_{rt} < I_{bkp} \\ (I_{rt} - I_{bkp}) \times s_2 + I_{bkp} \times s_1 & I_{bkp} \leq I_{rt} \end{cases}$$

In the case of $I_{op}$ values that are higher than the unrestrained current, $I_{unrt}$, the trip request is issued with the delay of TRD, regardless of the $I_{rt}$ magnitude.

In this example study, it is assumed that the differential relay is only equipped with the second harmonic blocking property; as this component is the most dominant one in the transformer currents during the GIC existence. Therefore, if the ratio of the differential current second harmonic component, $I_{2nd}$, to the differential current fundamental component ($I_{op}$) in each phase becomes larger than a pre-specified threshold $I_{2ndthr}$, the relay is blocked. In this condition, the second harmonic inhibition signal $S_{2ndinh}$, which is a bi-level signal with the value of either 0 or 1, is set to 1. Otherwise, the trip signal is sent to the transformer CBs with an adjustable time delay (TD), if there is any trip request. The harmonic components of the differential current are extracted using discrete Fourier transform (DFT). It is worth adding that the relay logic mentioned above is similarly implemented for all three phases A, B, and C.

Using time-domain simulations, it was demonstrated in the example study that the differential protection fails to operate for some in-zone faults during the GIC conditions. Various settings can be employed in the differential relay of FIG. 1, and the protection zone is the zone between the CTs located on the primary and secondary sides of the transformer. In this regard, the relay performance was studied for single-, two-, and three-phase short-circuit to the ground faults occurring on the transformer primary and secondary sides with and without the GIC. In simulations, the permanent faults with 0.1 Ω/phase resistance happen at 10 s. The GIC is applied at 0.1 s and it takes 9.9 s to reach its final steady-state level of about 200 A. In this part, $I_{2ndthr}$ is considered to be a typical value of 20%. The results of this investigation are summarized in TABLE 1. The word "YES" in this table means the relay is able to clear the internal fault, while "NO" means the relay failure to issue the trip signal. According to TABLE 1, the relay cannot clear the internal single-phase to ground faults occurring on the transformer HV and LV sides during the GMD. Nonetheless, the fault is detected, and the trip signal is sent to the transformer CBs in the cases of the two- and three-phase faults, no matter if the GIC exists or not.

TABLE 1

| Short-Circuit Fault Type/Location | Without GIC | With GIC |
| --- | --- | --- |
| Single-Phase/Primary | YES | NO |
| Single-Phase/Secondary | YES | NO |
| Two-Phase/Primary | YES | YES |
| Two-Phase/Secondary | YES | YES |
| Three-Phase/Primary | YES | YES |
| Three-Phase/Secondary | YES | YES |

Figure 8:
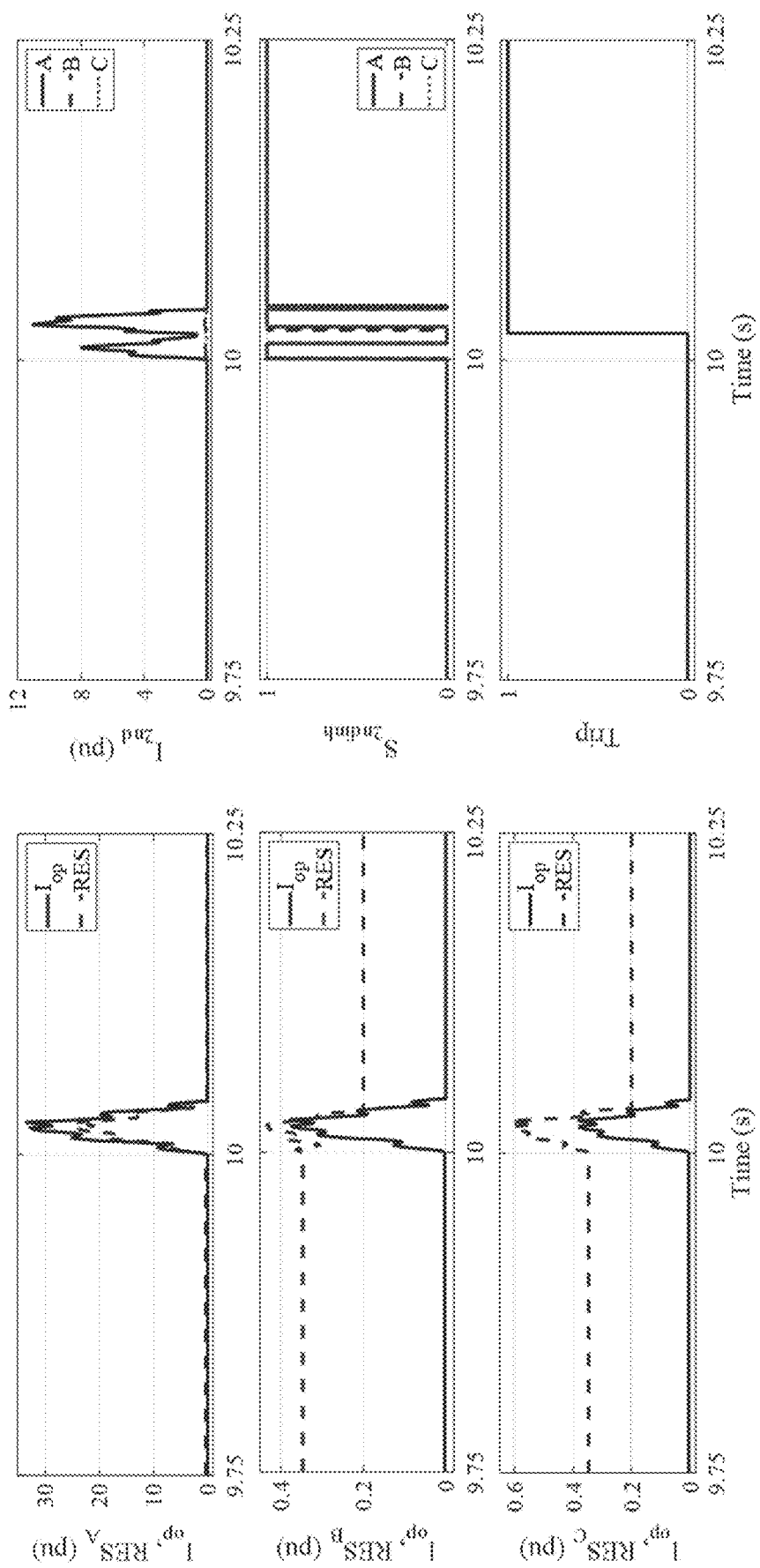
FIG. 8 illustrates charts showing an example of differential relay signals for phase A to ground fault (at 10 seconds (s)) on a transformer primary side in the absence of GIC.
Figure 9:
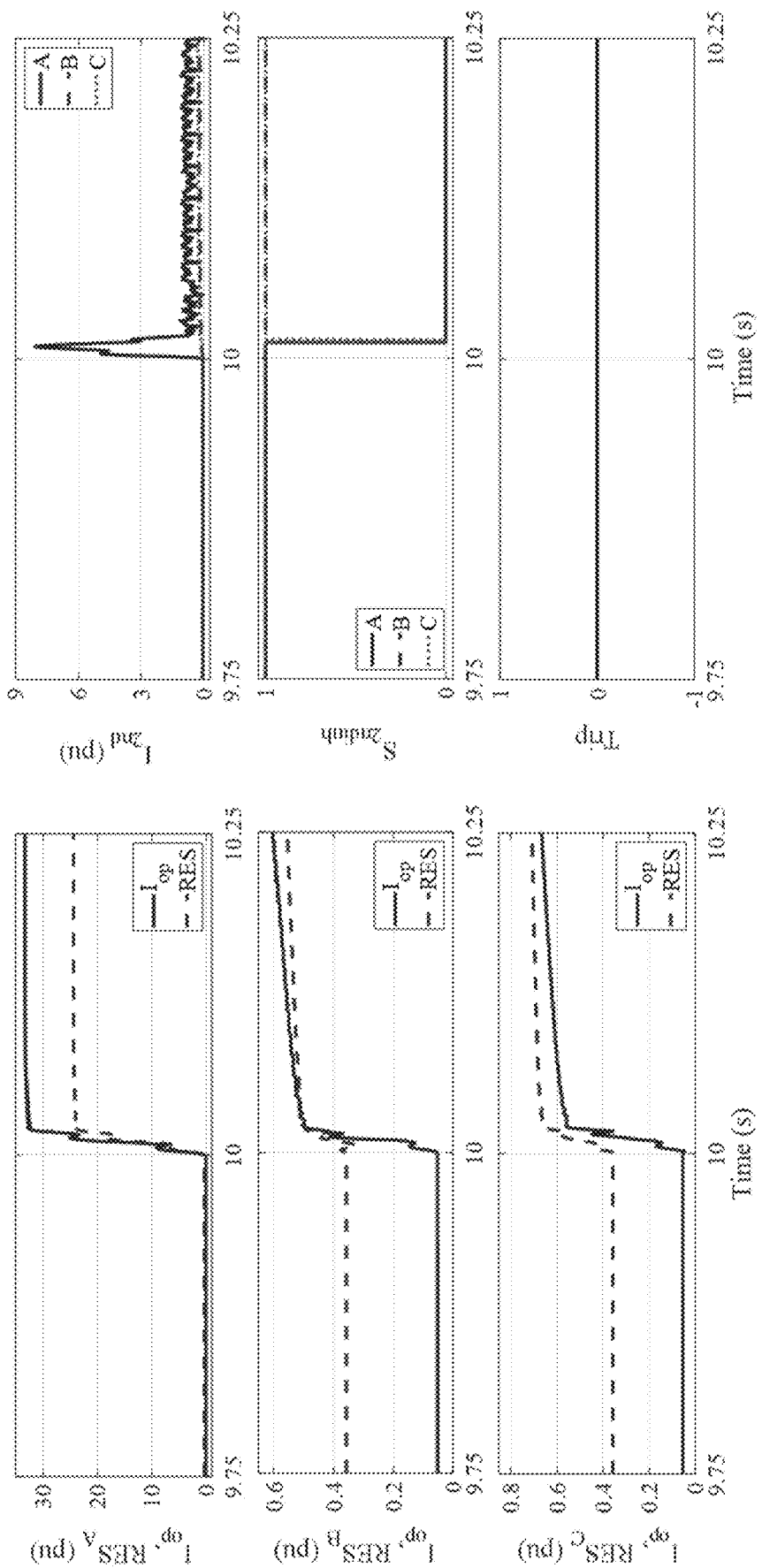
FIG. 9 illustrates charts showing an example of differential relay signals for phase A to ground fault (at 10 s) on a transformer primary side under the GIC condition.

FIG. 8 shows the relay signals, $I_{op}$, RES, and $I_{2nd}$ (all in pu) as well as $S_{2ndinh}$ and trip signal, before and after the single-phase to ground fault occurrence on the transformer primary side (on phase A) when there is no GIC. FIG. 9 depicts the relay signals before and during the fault under the GIC condition.

According to FIG. 8, once the fault occurs (at 10 s), $I_{op}$ becomes larger than RES in phase A, resulting in issuing a trip request. Since the inhibition signal ($S_{2ndinh}$) is zero for all three phases when there is a trip request (around 10.02 s), the transformer is tripped by the relay, as expected. On the other hand, as shown in FIG. 9, no trip signal is issued during the fault under the GIC condition. This is due to the fact that $S_{2ndinh}$, associated with phase B, remains at 1 after the fault occurrence, which prevents the relay from operation, while there is a trip request ($I_{op}$ becomes larger than RES, first for phase A and then for phase B).

Based on FIG. 9, $S_{2ndinh}$ is equal to 1 for all three phases before the fault occurrence because of the GIC, but the inhibition signal related to phase A (the faulty phase) changes to zero during the fault. Although an overall increase in the second harmonic component ($I_{2nd}$) is observed in phase A (and phases B and C as well) during the fault, this increase is less than the increment in the fundamental component ($I_{op}$) of phase A, making the ratio of $I_{2nd}$ to $I_{op}$ smaller than the specified threshold.

Figure 10:
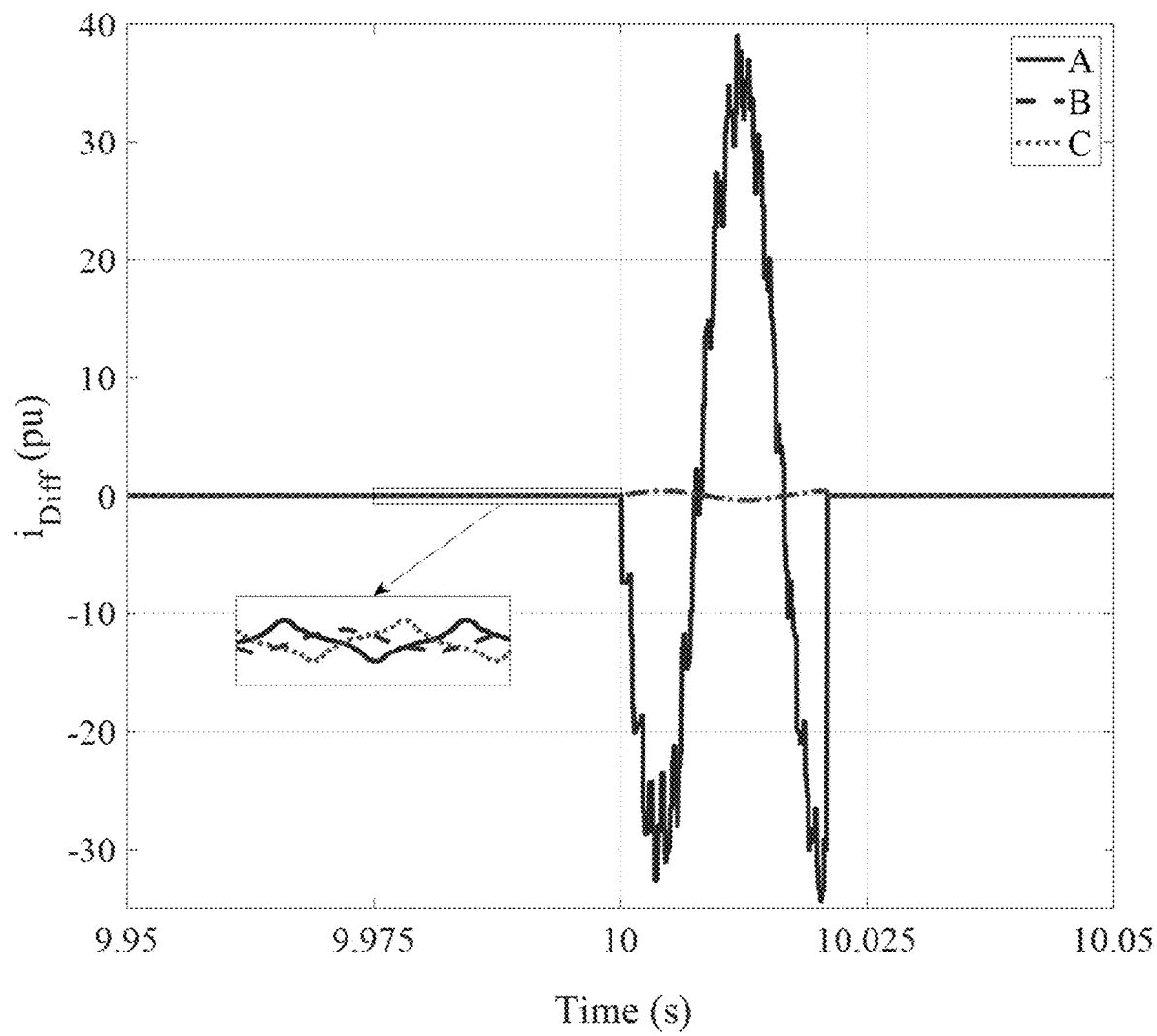
FIG. 10 illustrates a chart showing an example of three-phase differential current waveforms for phase A to ground fault (at 10 s) on a transformer primary side in the absence of GIC.
Figure 11:
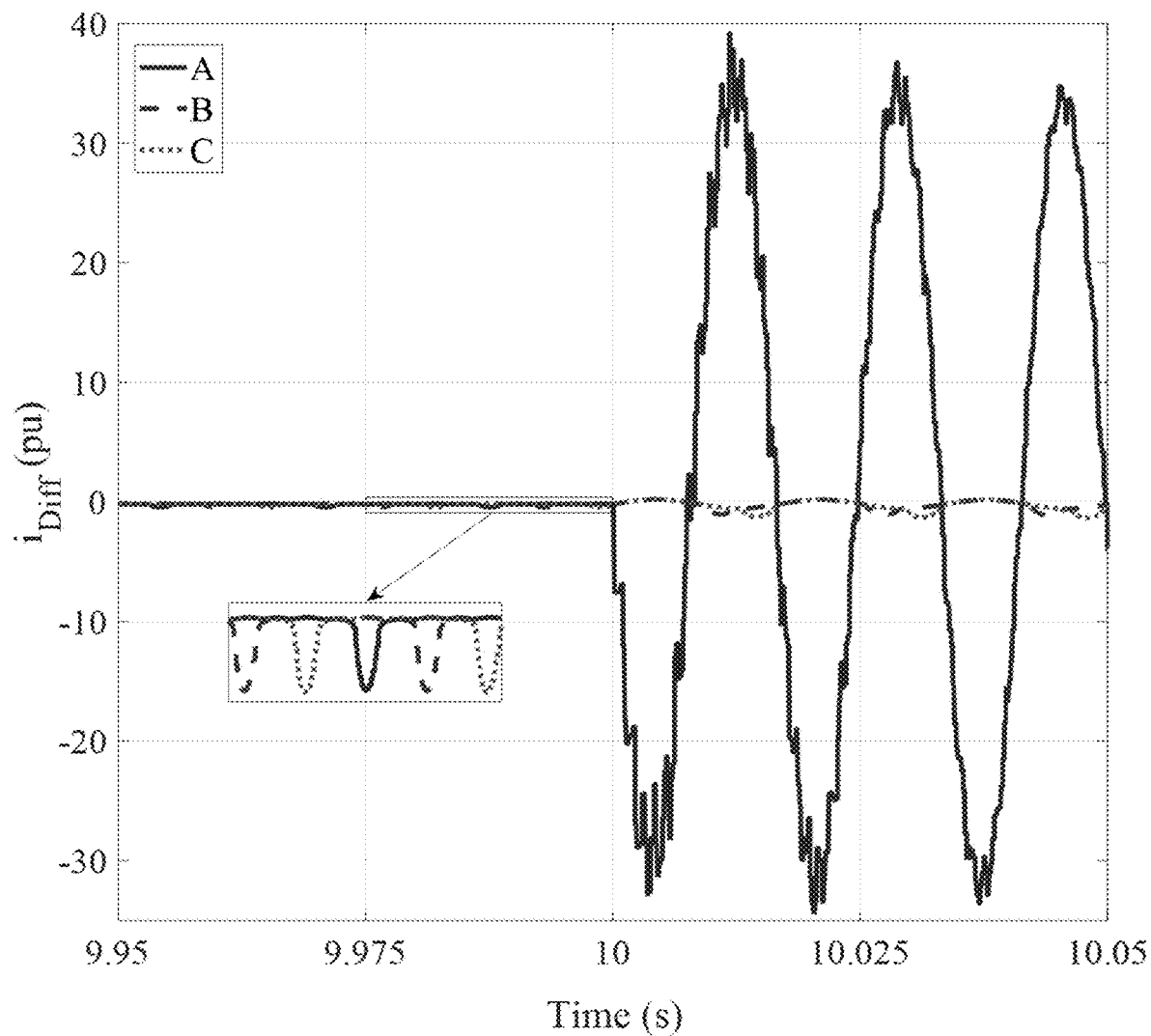
FIG. 11 illustrates a chart showing an example of three-phase differential current waveforms for phase A to ground fault (at 10 s) on a transformer primary side under the GIC condition.
Figure 12:
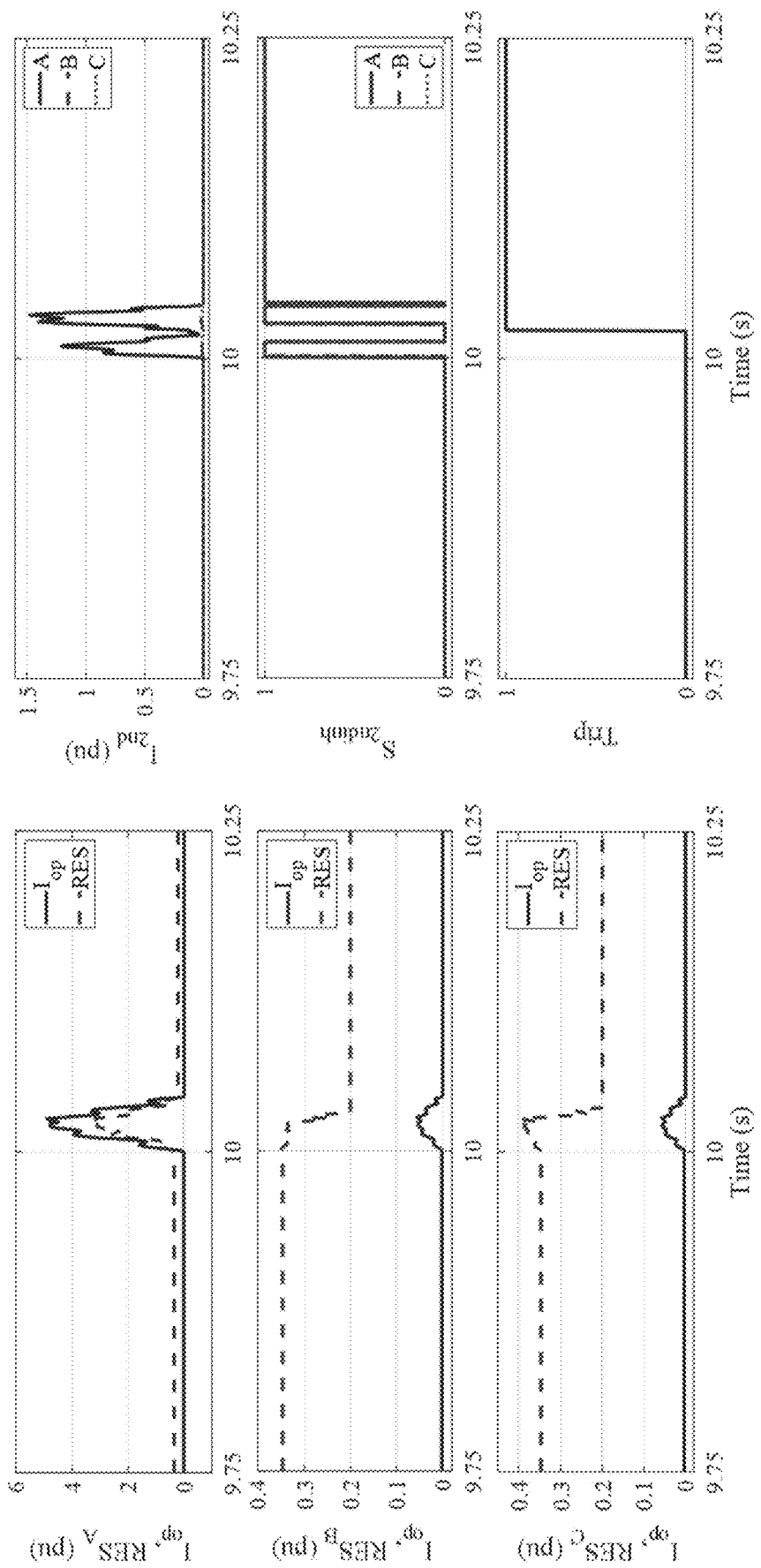
FIG. 12 illustrates charts showing an example of differential relay signals for phase A to ground fault (at 10 s) on a transformer secondary side in the absence of GIC.
Figure 13:
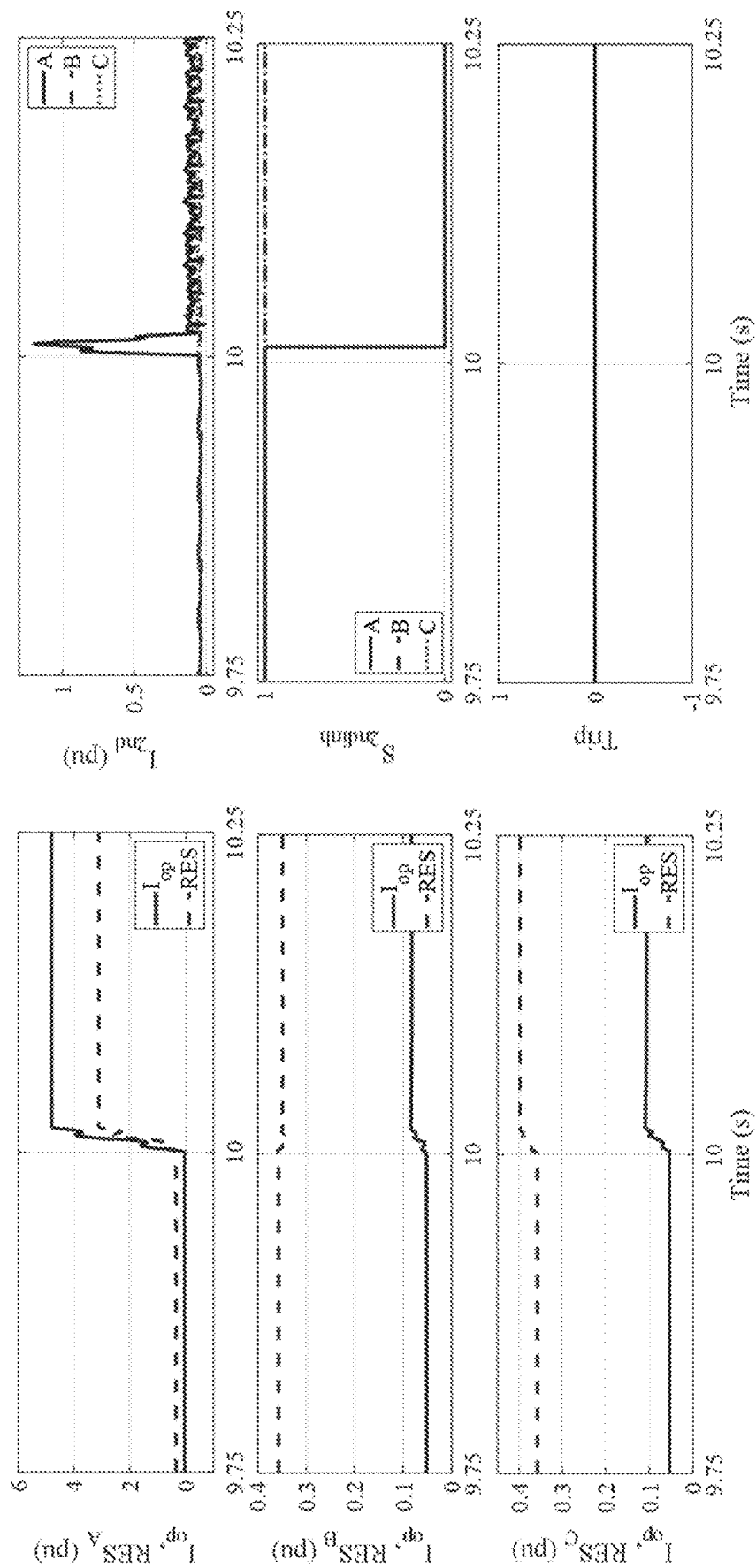
FIG. 13 illustrates charts showing an example of differential relay signals for phase A to ground fault (at 10 s) on a transformer secondary side under the GIC condition.

A graph of the three-phase differential current waveforms before and during the fault without and with the GIC are also illustrated in FIGS. 10 and 11, respectively. Due to the transformer core saturation caused by the GIC, it is observed in FIG. 11 that the three-phase currents are unipolar/asymmetrical before the fault occurrence. FIGS. 12 and 13 depict the relay signals for a phase A to ground fault on the secondary side of the transformer, in the absence and presence of the GIC, respectively. In FIG. 12, it can be seen that after the fault occurrence, the trip signal is sent to the transformer CBs as there is an interval in which $I_{op}$ in phase A is higher than the corresponding RES and $S_{2ndinh}$ is zero for all three phases. However, based on FIG. 13, while there is a trip request during the fault as $I_{op}$ is higher than RES in phase A, the relay cannot clear the fault under the GIC condition because $S_{2ndinh}$ remains set at 1 for phases B and C. This, in turn, leads to blocking the relay.

This example study shows that the transformer differential protection is vulnerable to the GMD effects and fails to clear the internal single-phase to ground faults which occur on both sides of the transformer under the GIC conditions; however, the transformer is tripped for such faults as expected, when there is no GIC.

It should be noted that some differential relays issue the trip signal if $I_{op}$ is larger than $I_{unrt}$ without considering $S_{2ndinh}$. However, such relays are still incapable of clearing the internal faults leading to $I_{op}$ values that are smaller than $I_{unrt}$, because of the harmonic blocking under GIC conditions.

Some factors, such as the fault resistance, the second harmonic inhibition level, and the transformer loading, can affect the relay performance in such a way that an internal two-phase short-circuit fault remains undetected during the GMD, as well. The corresponding simulated scenarios were also investigated in the example study and the associated results are presented in TABLE 2 (the fault location is assumed to be on the transformer secondary side):

Scenario I (the fault resistance effect): occurrence of the faults with the resistance 0.87Ω and 0.1 Ω (indicated as $R_f$ in TABLE 2). Generally, 0.87 Ω is selected since the two-phase faults with smaller resistance values can be cleared in this scenario.

Scenario II (the second harmonic inhibition level effect): the parameter, $I_{2ndthr}$, is set at typical values 15% and 20% while the fault resistance is 0.66Ω. Generally, 0.66Ω selected since the two-phase faults with smaller resistance values can be cleared in this scenario when $I_{2ndthr}$=15%.

Scenario III (the transformer loading effect): the fault with the resistance of 0.66Ω occurs when there is no load connected to the test system and also in the case of the load consuming the nominal power, which are indicated as no-load and nominal load in TABLE 2, respectively. The value of $I_{2ndthr}$ is the same as the one in Scenario I (i.e., 20%).

TABLE 2

| Scenario | $R_f$ = 0.87 Ω | $R_f$ = 0.1 Ω |
| --- | --- | --- |
| I | NO | YES |
| II | $I_{2ndthr}$ = 15% <br> NO | $I_{2ndthr}$ = 20% <br> YES |
| III | No-Load <br> NO | Nominal Load <br> YES |

Based on TABLE 2, in Scenario I, when the fault resistance is 0.87Ω (or more), the relay is not able to trip the transformer for the two-phase short-circuit fault under the GIC condition; however, the fault is interrupted when the resistance is 0.1Ω (TABLES 1 and 2). Considering Scenario II, the relay with $I_{2ndthr}$ equal to 15%, cannot send the trip signal to the transformer CBs for the simulated fault during the GMD. But for the same fault condition and $I_{2ndthr}$ equal to 20%, the relay is capable of clearing the fault even when there is GIC. This is because of the fact that by the decrease of $I_{2ndthr}$ setting from 20% to 15%, the relay sensitivity to the second harmonic level in the differential current increases, which makes the relay be more functionally affected by the GIC-caused second harmonics. According to Scenario III, unlike the nominal load condition, the relay is incapable of interrupting the fault in the no-load condition during the GMD, indicating that the GIC adverse effects on the relay performance increases as the transformer loading decreases. It should be added that in all three scenarios, the relay successfully operates as expected when there is no GIC.

Accordingly, the example study shows the performance of a differential relay, employed in the transformer protection, for different types of internal short-circuit faults which occur during the GMD. Using time-domain simulations, it was shown that the relay employing the second harmonic blocking has difficulty tripping the transformer for some internal single-phase to ground faults when the GIC passes through the transformer windings. Furthermore, the sensitivity analysis of the affecting parameters reveals that the relay cannot trip the transformer in the case of an internal double-phase short-circuit fault in presence of GIC. The simulation results of the studied system show that the likelihood of the differential relay maloperation during the GMD increases with (i) increase of the fault resistance, (ii) decrease of the second harmonic inhibition level, and (iii) decrease of the transformer load. Thus, the differential relays logics can be modified in order to enhance the performance of the transformer differential protection under the GIC conditions.

Further, the example study indicates that, generally, differential relays, which are currently used for protection of high voltage transformers, fail to clear some short-circuit faults under geomagnetically induced current (GIC) conditions. Particularly because in these conditions, the differential relays are prevented from operation due to second harmonic blocking. The present embodiments provide, as an example, a logic for differential relays so that handling in cases of simultaneous occurrence of GIC and internal faults can be substantially improved.

Figure 14:
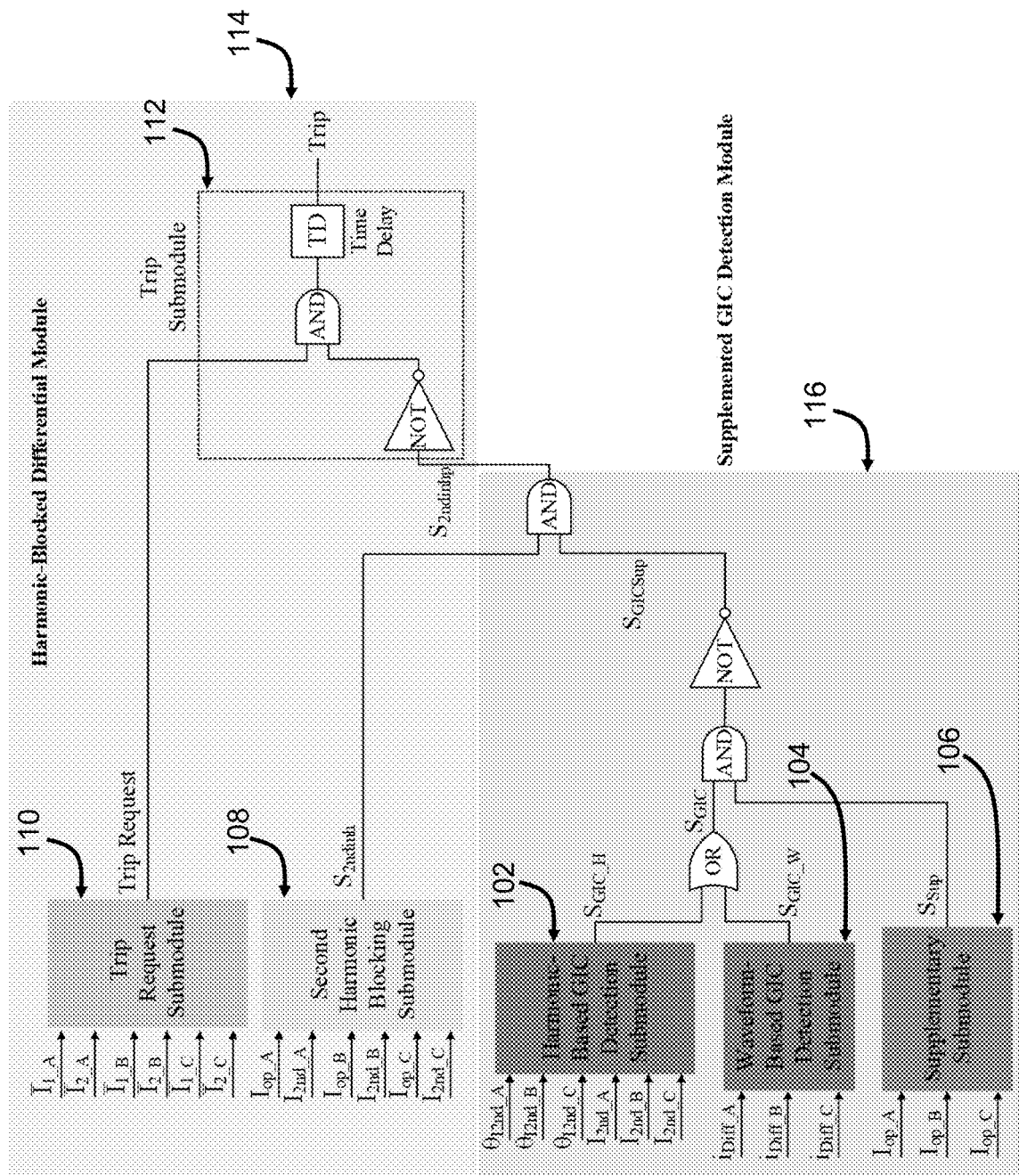
FIG. 14 illustrates an example of a circuit logic diagram for transformer differential protection under GIC conditions.

FIG. 14 illustrates a circuit logic diagram for an example of a supplemented geomagnetically induced current (GIC) detection module 116 implemented with a harmonic-blocked differential element 114 for transformer differential protection. The supplemented GIC detection element 116 includes three modules, a harmonic-based GIC detection module 102, a waveform-based GIC detection module 104, and a supplementary module 106. The supplemented GIC detection element 116 overrules the second harmonic blocking signal ($S_{2ndinh}$) or unblocks the differential relay under a GIC condition and during an internal short-circuit fault; this makes the relay able to send the trip signal to the transformer circuit breakers (CBs) as the trip request is equal to one. Overruling $S_{2ndinh}$ means that the supplemented second harmonic blocking signal ($S_{2ndinhp}$) in FIG. 14 is set to zero while $S_{2ndinh}$ is equal to one during a geomagnetic disturbance (GMD). Either the harmonic-based GIC detection module 102 or the waveform-based GIC detection module 104 (or both) issues a high (one) GIC signal ($S_{GIC}$) if there is a GMD, which unblocks the differential relay (i.e., $S_{2ndinh}$ is overruled) if the supplementary signal ($S_{Sup}$) is one as well. The supplementary module 106 is used such that the differential relay is unblocked only if an internal short-circuit fault occurrence is suspected during a GMD. Otherwise, the unblocked relay may malfunction under the GIC condition (when there is no fault). So, in the case of an internal fault during a GMD (i.e., $S_{GIC}$ is 1), $S_{Sup}$ changes from 0 to 1; therefore, the supplemented GIC signal ($S_{GICSup}$) becomes low (zero), which means that the relay is unblocked ($S_{2ndinhp}$ is 0). Consequently, a high trip signal is issued after an adjustable time delay (TD) as the trip request signal is one in the case of the fault.

Figure 15:
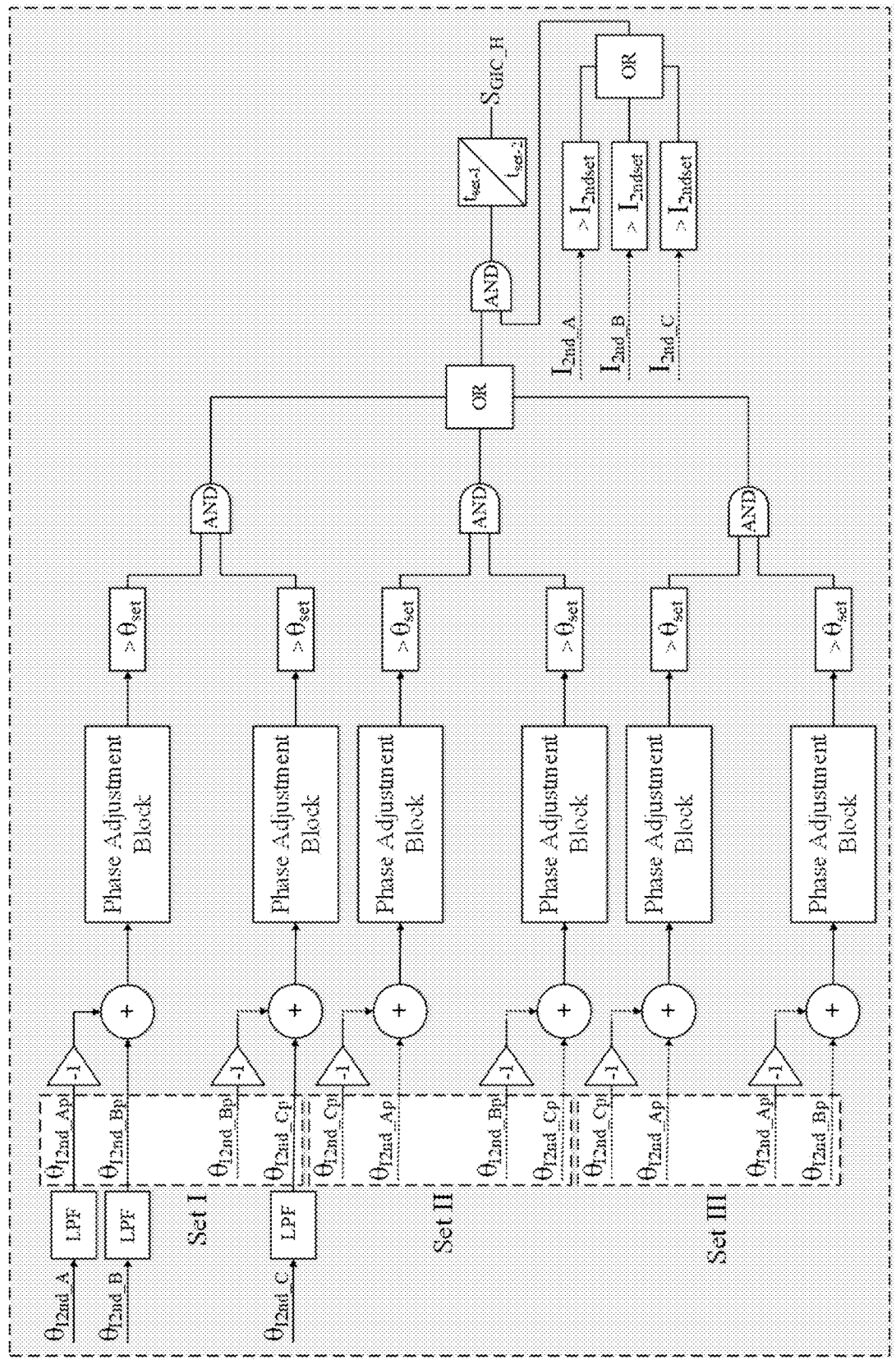
FIG. 15 illustrates an example of a circuit logic diagram for a harmonic-based GIC detection module for the transformer differential protection of FIG. 14.
Figure 16:
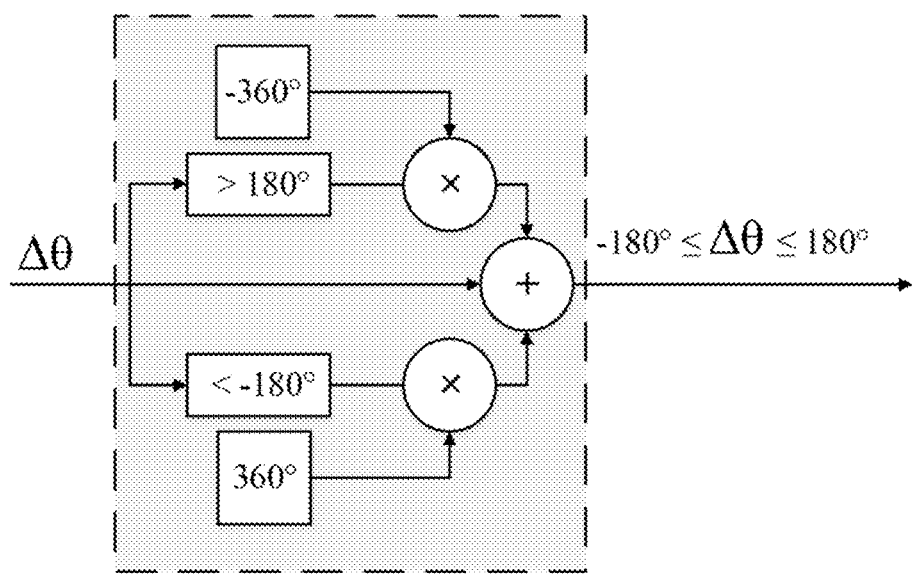
FIG. 16 illustrates an example of a circuit logic diagram for a phase adjustment block for the harmonic-based GIC detection module of FIG. 15.

FIG. 15 illustrates an example of circuit logic for the harmonic-based GIC detection module 102. In this example, the inputs are phase angles ($\theta_{2nd}$) and magnitudes ($I_{2nd}$) of second harmonic components of differential currents related to phases A, B, and C, and the output is $S_{GIC\_H}$. Generally, the harmonic components can be extracted from instantaneous differential currents, monitored by the differential relay, using discrete Fourier transform (DFT). In this example, the phase angles are passed through low pass filters (LPFs) in order to remove high frequency transients. The filtered phase angles ($\theta_{I2ndp}$) are processed to check whether one of the sets of requirements (i.e., Set I, Set II, and Set III as described below) is met. Parameter $\theta_{set}$ is an adjustable threshold and can be any desired value. The requirements are satisfied if the second harmonic phasors are in a negative-sequence format (ABC, considering the counter-clockwise rotation), while they are in a positive-sequence format (ACB) as a transformer energization occurs. The phase adjustment block can be used to ensure that any calculated phase difference ($\Delta\theta$) lies in the range of −180° to 180°. An example of circuit logic of the phase adjustment block is shown in FIG. 16. Thus, if Set I, Set II, or Set III is met, and at least one of the magnitudes of the second harmonic phasors is greater than $I_{2ndset}$ for more than an adjustable pickup time ($t_{set-1}$), $S_{GIC\_H}$ becomes one. The latter criterion can be applied to differentiate a normal condition from a GIC condition as $S_{GIC\_H}$ is kept equal to zero provided all magnitudes of the second harmonic phasors are smaller than $I_{2ndset}$. The adjustable threshold, $I_{2ndset}$, can be any desired small value, for example, 0.001 pu. $S_{GIC\_H}$ is kept equal to one for an adjustable dropout time ($t_{set-2}$) after the aforementioned requirements are no longer met. The dropout time, $t_{set-2}$, helps prevent any possible relay blocking during an internal fault since shortly after the fault happens, the second harmonic phase angles may violate the sets of requirements below. Consequently, if $t_{set-2}$ is 0 s, the differential relay can be blocked before a high trip request signal is issued. $t_{set-2}$ can be any desired value, for example, 3 cycles (i.e., 0.05 s in 60 Hz systems).

$$\begin{cases} \text{Set } I: & \theta_{I_{2nd_B}} - \theta_{I_{2nd_A}} \quad \text{AND} \quad \theta_{I_{2nd_C}} - \theta_{I_{2nd_B}} > \theta_{set} \\ & \qquad\qquad\qquad\quad \text{OR} \\ \text{Set } II: & \theta_{I_{2nd_A}} - \theta_{I_{2nd_C}} \quad \text{AND} \quad \theta_{I_{2nd_C}} - \theta_{I_{2nd_B}} > \theta_{set} \\ & \qquad\qquad\qquad\quad \text{OR} \\ \text{Set } III: & \theta_{I_{2nd_A}} - \theta_{I_{2nd_C}} \quad \text{AND} \quad \theta_{I_{2nd_B}} - \theta_{I_{2nd_A}} > \theta_{set} \end{cases}$$

Figure 17:
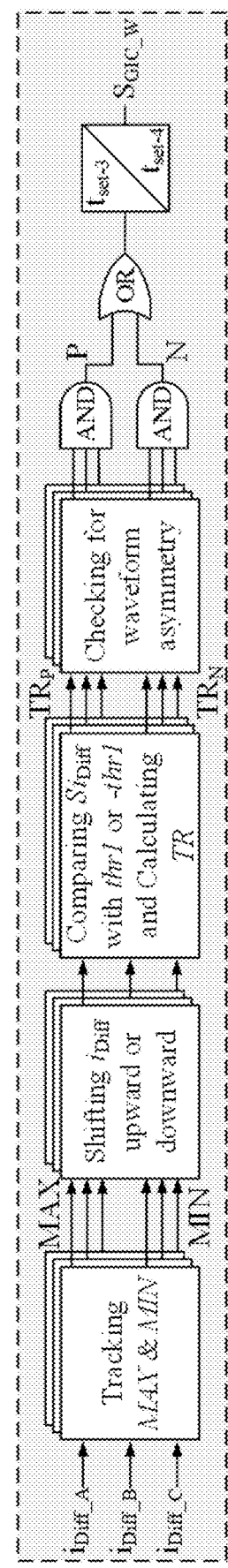
FIG. 17 illustrates an example of a circuit logic diagram for a waveform-based GIC detection module for the transformer differential protection of FIG. 14.
Figure 18A:
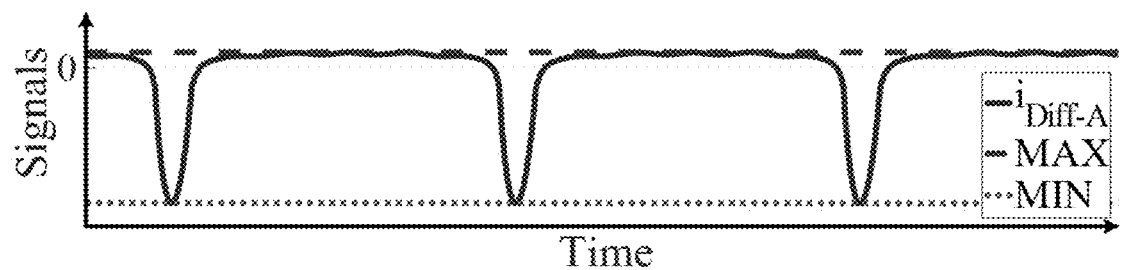
FIG. 18A illustrates a chart showing an example of differential current waveform and its maximum (MAX) and minimum (MIN) values associated with phase A under GIC condition.
Figure 18B:
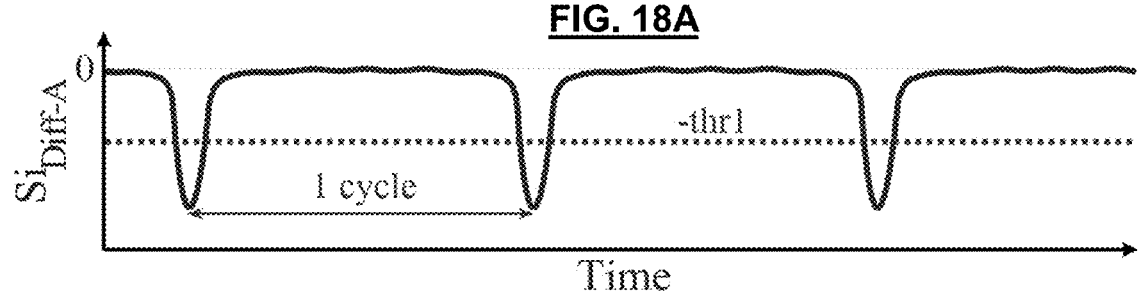
FIG. 18B illustrates a chart showing an example of shifted differential current waveform associated with phase A under GIC condition.
Figure 19A:
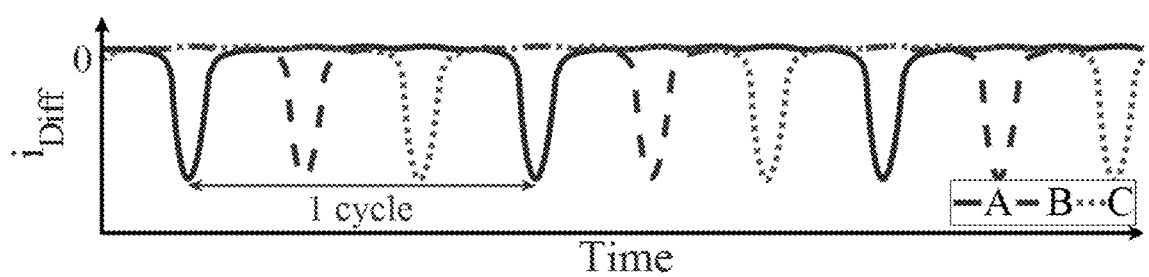
FIG. 19A illustrates a chart showing an example of three-phase differential current waveforms under GIC condition.
Figure 19B:
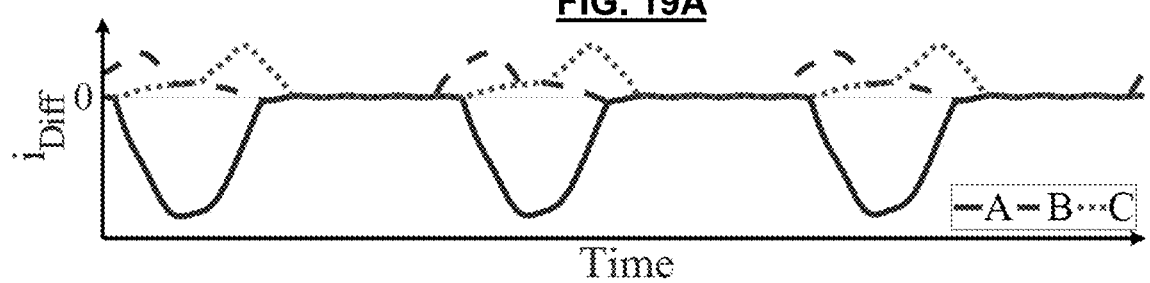
FIG. 19B illustrates a chart showing an example of three-phase differential current waveforms during transformer energization.

FIG. 17 illustrates an example of circuit logic for the waveform-based GIC detection module 104. In this example, the inputs are instantaneous differential current waveforms ($i_{Diff}$) related to phases A, B, and C, and the output is $S_{GIC\_W}$. For each phase, the maximum (MAX) and minimum (MIN) values of $i_{Diff}$ in each cycle are tracked. A sample $i_{Diff}$ related to phase A ($i_{Diff}$) and its MAX and MIN values during a GMD are illustrated in FIG. 18A. As shown in FIG. 17, $i_{Diff}$ is shifted upward or downward, depending on its MAX and MIN values in order to obtain a shifted $i_{Diff}$ ($Si_{Diff}$) that is completely positive or negative in each cycle. As illustrated in FIG. 18B, the sample waveform is shifted downward since the magnitude of MIN is larger than MAX (FIG. 18A), resulting in a negative $Si_{Diff}$ of phase A (Sim A). On the other hand, the waveform is shifted upward if its MAX is larger than its MIN magnitude, leading to a positive $Si_{Diff}$. The positive Sim is then compared with an adjustable threshold, i.e., thr1. If $Si_{Diff}$ is negative, it is compared with −thr1, as depicted in FIG. 18B (for example). Afterwards, the period of time within a cycle, in which Sim is higher or lower than thr1 or −thr1, respectively, is calculated. The calculated time period divided by 1 cycle (i.e., 0.0167 s in 60 Hz systems) is referred to as time ratio (TR) in FIG. 17. In FIG. 17, $TR_P$ is associated with a positive $Si_{Diff}$, while $TR_N$ is related to a negative $Si_{Diff}$. After calculating TR, it is checked whether it meets the criteria described herein. The thresholds, thr2 and thr3, are adjustable and can be any desired values. The threshold, thr2, is to avoid issuing a wrong GIC signal due to transients and noise, and thr3, is to discriminate waveform asymmetry from waveform symmetry. During a GMD or a transformer energization, $i_{Diff}$ is an asymmetrical waveform because of transformer core saturation, and hence, the corresponding TR is smaller than or equal to thr3. During short-circuit faults (for example), $i_{Diff}$ is symmetrical, and the associated TR exceeds thr3. As diagrammatically illustrated in the example of FIG. 17, if $TR_P$ or $TR_N$ of all phases A, B, and C satisfy the requirements below, a P or N equal to one is issued, meaning that $i_{Diff}$ of the three phases are asymmetrical in a positive or negative direction, respectively. FIG. 19A illustrates sample $i_{Diff}$ related to phases A, B, and C during GIC, where all the waveforms are asymmetrical in a negative direction, i.e., N is one and P is zero in this example. However, when a transformer energization occurs, $i_{Diff}$ of one phase has an opposite direction compared to those of other phases, as illustrated in FIG. 19B, as an example. Therefore, P and N remain equal to zero during the energization. In this way, the waveform-based GIC detection module 104 can distinguish a GIC condition from a transformer energization condition. In FIG. 17, $S_{GIC\_W}$ becomes one if P or N remains at one for more than an adjustable pickup time ($t_{set-3}$) that is considered to avoid issuing a false $S_{GIC\_W}$ during transients. For disturbances, such as the short-circuit faults, at least $i_{Diff}$ of one phase becomes symmetrical, making P or N change to zero. Thereby, to ensure the relay unblocking, $S_{GIC\_W}$ is kept equal to one for an adjustable dropout time ($t_{set-4}$) after P or N changes to zero.

$$thr2 \leq TR \leq thr3$$

Figure 20:
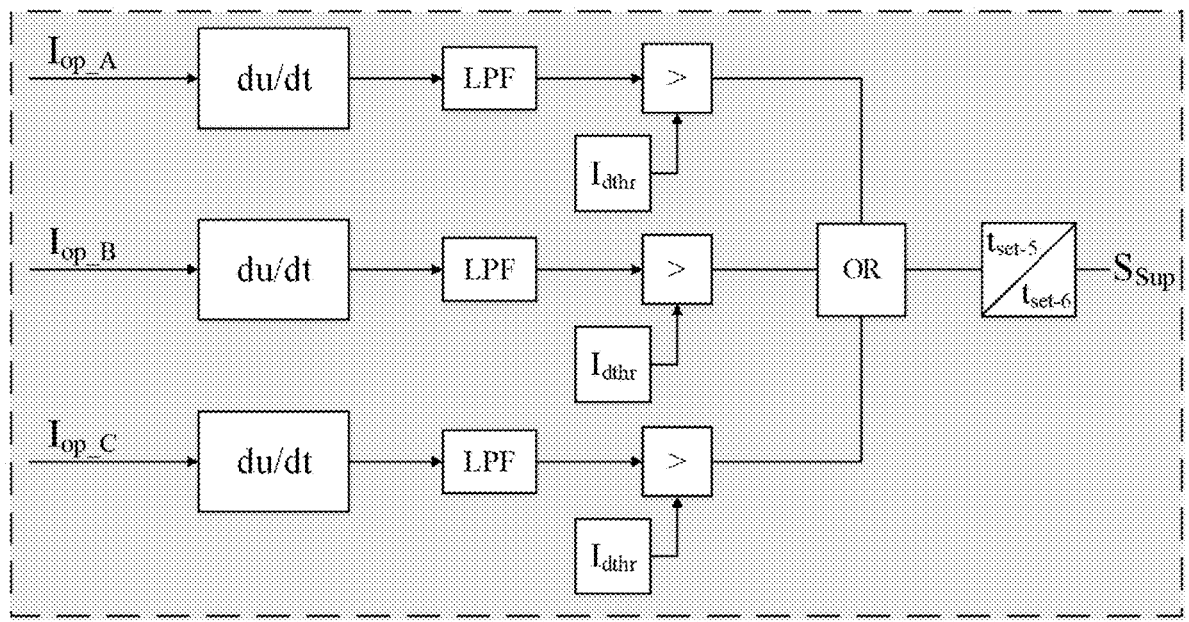
FIG. 20 illustrates an example of a circuit logic diagram of a supplementary module for the transformer differential protection of FIG. 14.

FIG. 20 illustrates an example of circuit logic for the supplementary module 106. The inputs to the supplementary module 106 are the magnitudes of the operation (differential) currents ($I_{op}$) with the fundamental frequency, related to phases A, B, and C. The output of the supplementary module 106 is $S_{Sup}$. The differential currents of the three phases are passed through derivative blocks in order to obtain rates of change of the differential currents. In some cases, these values are filtered by LPFs to get rid of existing high frequency transients, and compared with an adjustable threshold ($I_{dthr}$). The threshold, $I_{dthr}$, is determined to be high enough to keep $S_{Sup}$ equal to 0 for disturbances, such as load switching and external short-circuit faults (to avoid any unwanted differential relay unblocking during a GMD for such disturbances). It is also determined to be low enough to unblock the relay for the internal faults with even high impedance values under the GIC condition. If one of the values of rate of change of current (at least) exceeds $I_{dthr}$, $S_{Sup}$ becomes one after an adjustable pickup time ($t_{set-5}$), which unblocks the relay provided $S_{GIC}$ is one as well (FIG. 14). $S_{Sup}$ is kept equal to one for an adjustable dropout time ($t_{set-6}$) after the aforementioned requirement is no longer met. This ensures that, under the GIC condition, the differential relay remains unblocked during a suspected internal fault until a high trip request signal is issued, which results in tripping the transformer.

Figure 21:
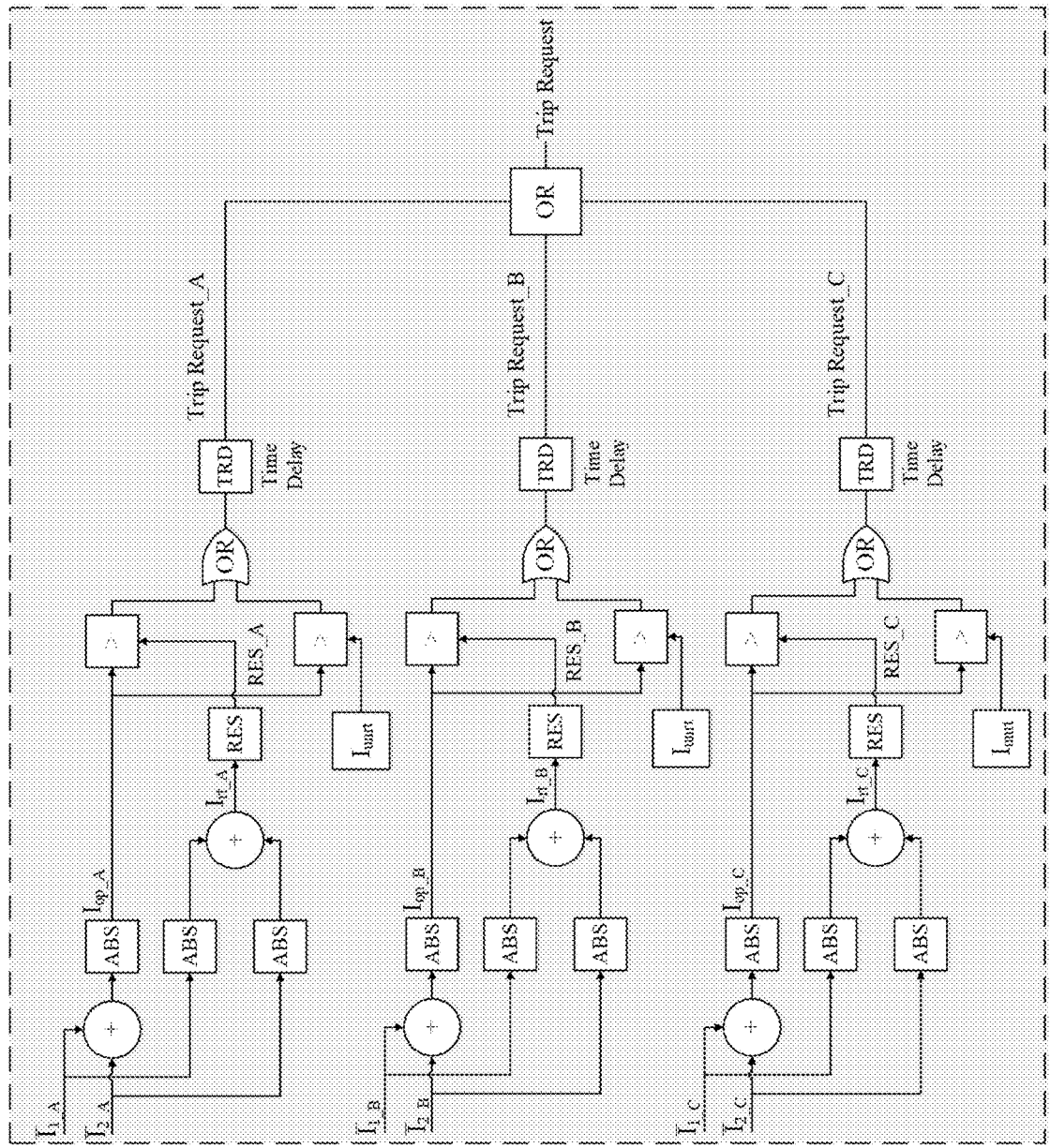
FIG. 21 illustrates an example of a circuit logic diagram of a trip request module for the transformer differential protection of FIG. 14.

FIG. 21 illustrates an example of circuit logic for the trip request module 110. Inputs to the trip request module 110 are the transformer primary ($\overline{I_1}$) and secondary ($\overline{I_2}$) current phasors (with the fundamental frequency) related to three phases A, B, and C, and the output is the trip request. $\overline{I_1}$ and $\overline{I_2}$, respectively, are the phasor signals of $i_1$ and $i_2$ provided by the current transformers (CTs) in FIG. 1. For each phase, if $I_{op}$ is larger than the calculated RES (as described herein), which is based on the value of the restraint current ($I_{rt}$), a request for tripping the transformer is made with an adjustable time delay (TRD). Otherwise, the trip request signal is zero for $I_{op}$ values smaller than or equal to the calculated RES. In the case of $I_{op}$ values larger than the unrestrained current ($I_{unrt}$), a high (one) trip request is issued with the delay of TRD, regardless of $I_r$ value. In FIG. 21, each "ABS" block determines the phasor magnitude.

Figure 22:
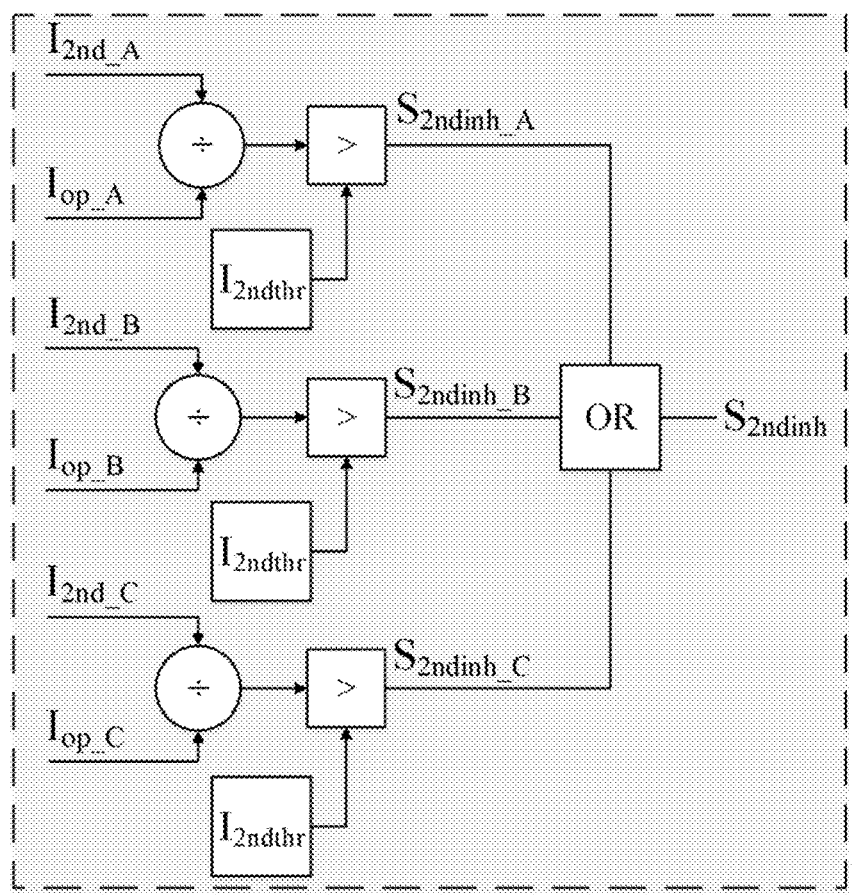
FIG. 22 illustrates an example of a circuit logic diagram of a second harmonic blocking module for the transformer differential protection of FIG. 14.

FIG. 22 illustrates an example of circuit logic for the second harmonic blocking module 108. The inputs to the second harmonic blocking module 108 are $I_{op}$ and $I_{2nd}$ related to three phases A, B, and C, and its output is $S_{2ndinh}$. The second harmonic blocking module 108 can be used to prevent the differential relay from operation if the magnitude of the second harmonic component ($I_{2nd}$) in the differential current is more than a given value that is determined based on the magnitude of the differential current ($I_{op}$) and a predetermined threshold ($I_{2ndthr}$). According to FIG. 22, if the ratio of $I_{2nd}$ to $I_{op}$, related to any phase, is larger than $I_{2ndthr}$, $S_{2ndinh}$ changes from zero to one.

Figure 23:
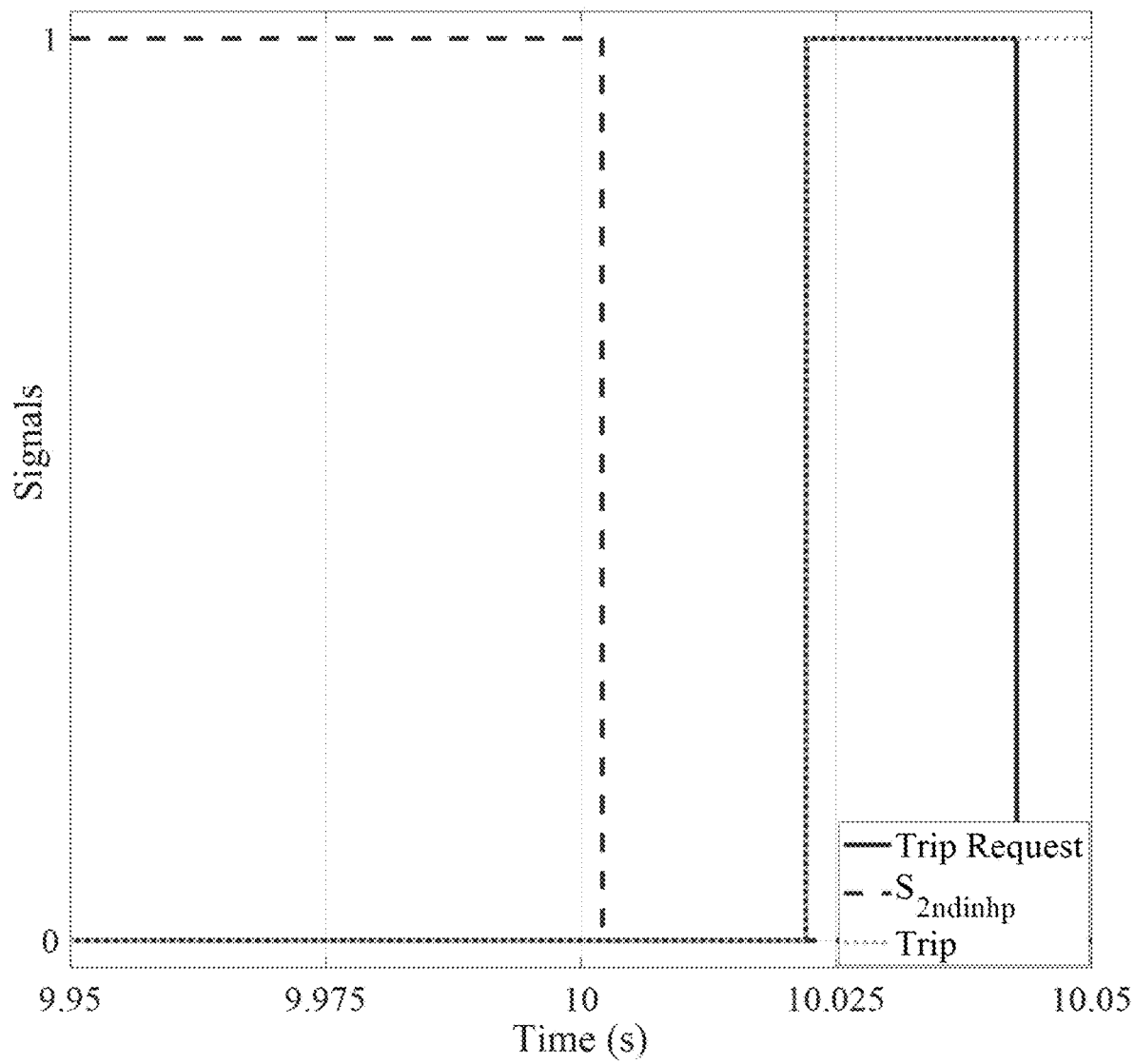
FIG. 23 illustrates a chart showing an example of trip request, supplemented second harmonic blocking, and trip signals associated with phase A to ground fault (at 10 s) on a transformer secondary side under GIC condition.
Figure 24:
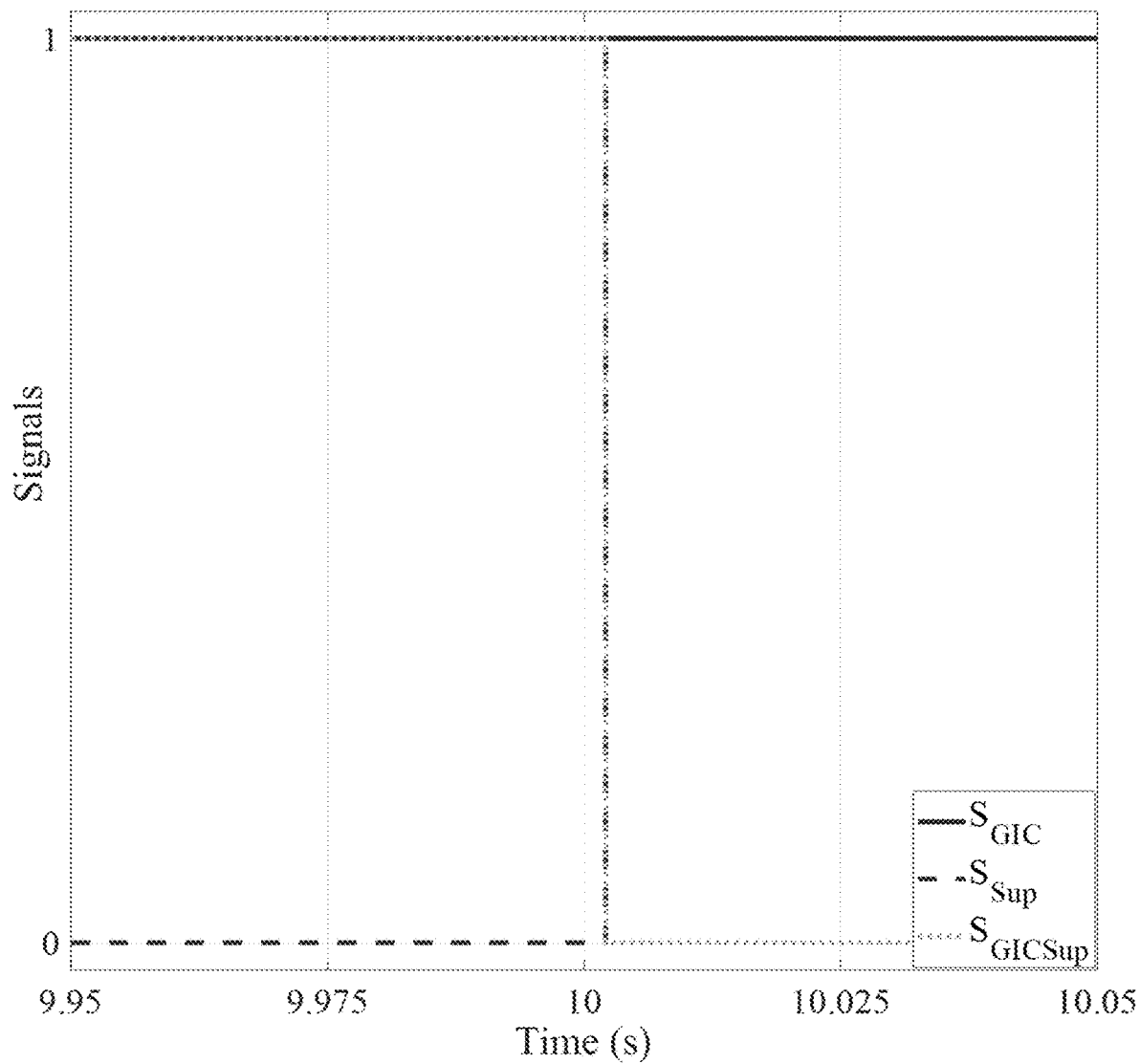
FIG. 24 illustrates a chart showing an example of GIC, supplementary, and supplemented GIC signals associated with phase A to ground fault (at 10 s) on a transformer secondary side under the GIC condition.

As illustrated in FIGS. 9 and 13, a typical differential relay is likely to fail to clear the internal short-circuit faults under GIC conditions. The present inventors conducted an example simulation to illustrate superior performance of the transformer differential protection of FIG. 14 during simultaneous occurrence of an internal short-circuit fault and a GMD. As shown in the chart of FIG. 13, the typical relay does not trip the transformer when an internal phase A to ground fault occurs on the transformer secondary side at 10 s during GIC. FIG. 23 depicts a chart showing that for the same fault, while there is GIC, the differential relay of the present embodiments (FIG. 14) can successfully trip the transformer at 10.022 s (the trip signal changes from zero to one) since the trip request signal becomes one at this time and the relay is not blocked. In FIG. 23, observe that the supplemented second harmonic blocking signal ($S_{2ndinhp}$) becomes zero at 10.002 s, which means overruling $S_{2ndinh}$ or unblocking the relay at this time before issuing the high (one) trip request signal. As illustrated in the chart of FIG. 24, the supplemented GIC signal ($S_{GICSup}$) changes from one to zero at 10.002 s, causing $S_{2ndinhp}$ to become zero. $S_{GICSup}$ becomes zero because shortly (0.002 s) after the fault happens, the supplementary module 106 issues a high supplementary signal ($S_{Sup}$). $S_{GIC}$, in the example of FIG. 24, is one before and after the fault occurrence, meaning that the GIC condition is correctly detected.

Advantageously, the supplemented GIC detection element 116 can be applied to existing differential relays, such that their performance can be improved for internal short-circuit faults during geomagnetic disturbances (GMDs). This offers protection that can prevent costly damages that can occur to the transformers because of the uninterrupted faults. Removing, or significantly reducing the chances of, such faults can significantly enhance the power system's resilience and reliability and potentially save great expense through prevention of system and equipment failures. Advantageously, the present embodiments can generally be applied to any differential relay employed in transformer protection in order to ensure relay operation against internal short-circuit faults during GMDs.

Figure 25:
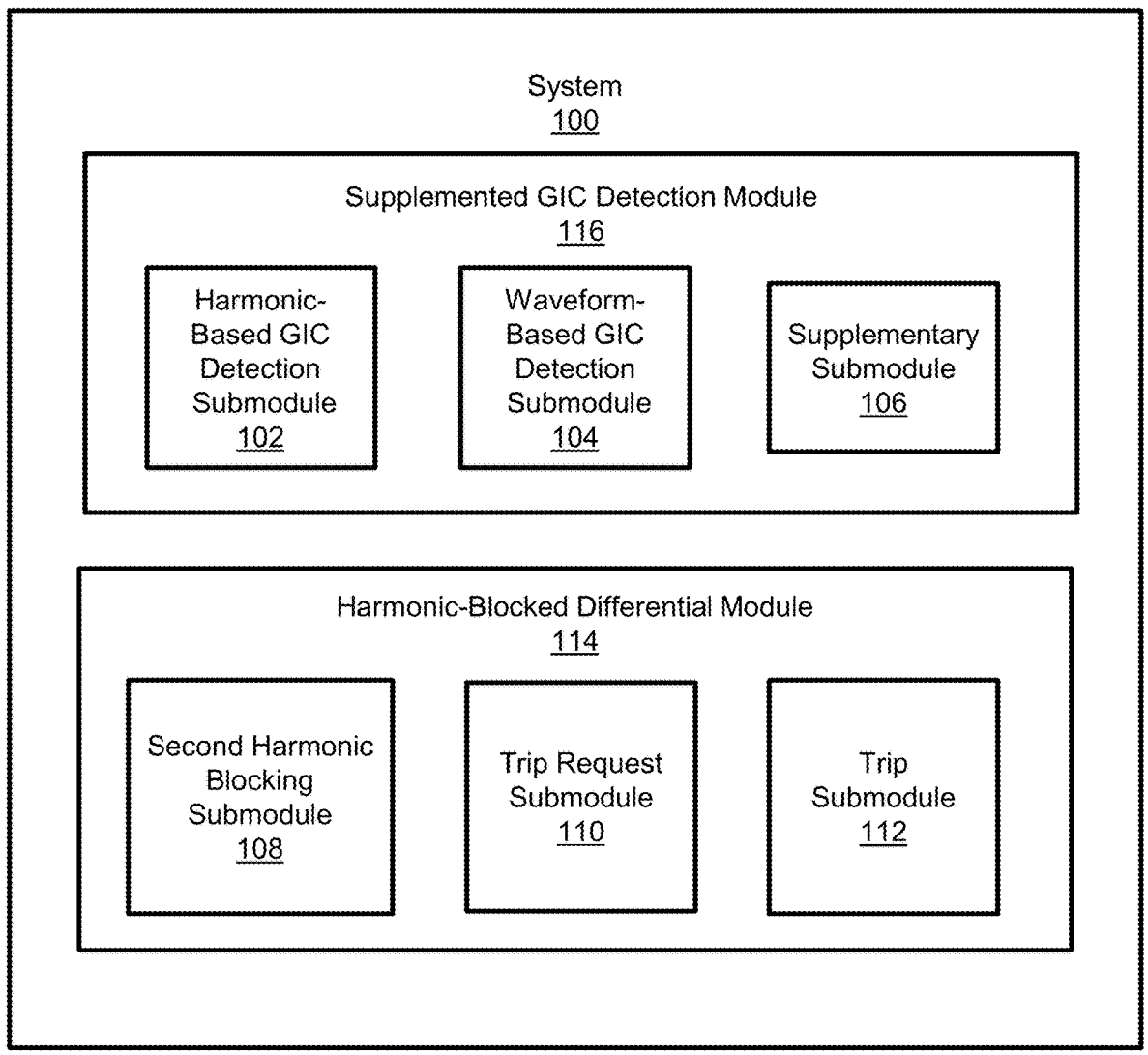
FIG. 25 is a schematic diagram of a system for differential protection of a transformer under geomagnetically induced current (GIC), according to an embodiment.

FIG. 25 illustrates a conceptual diagram of a system 100 for transformer differential protection under geomagnetically induced current (GIC), in accordance with an embodiment. The system 100 comprises the supplemented GIC detection element 116, comprising the harmonic-based GIC detection module 102, the waveform-based GIC detection module 104, and the supplementary module 106. The system 100 can further comprise the harmonic-blocked differential element 114, comprising the second harmonic blocking module 108, the trip request module 110, and the trip module 112. The modules can be connected by any suitable bus or connection structure. In the present embodiment, the modules can be implemented in hardware via electrical circuit logic; however, in further embodiments, some or all of the functions of the modules can be executed on one or more processors with instructions located on data memory storage.

Figure 26:
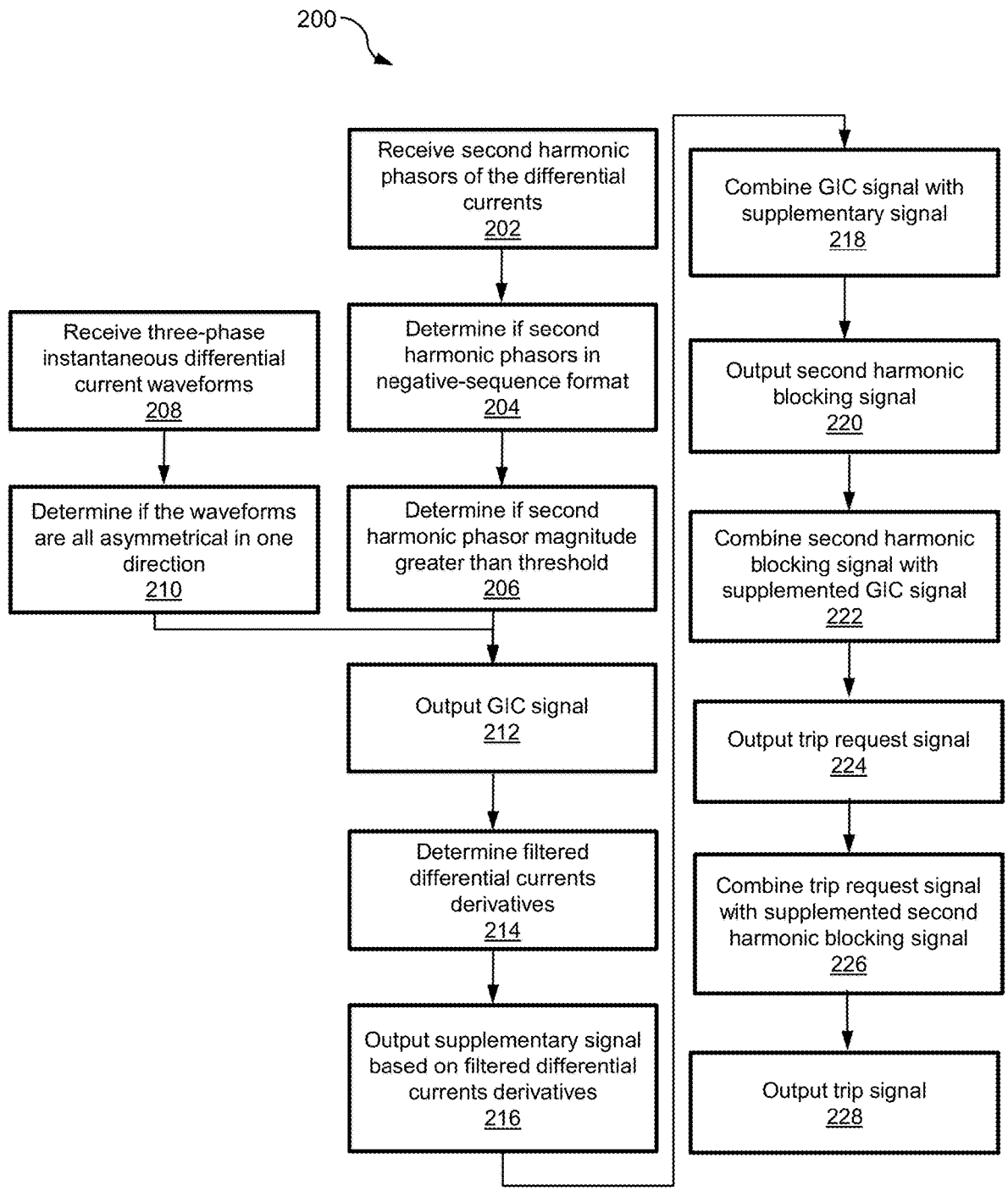
FIG. 26 is a flowchart for a method for differential protection of a transformer under geomagnetically induced current (GIC), according to an embodiment.

FIG. 26 illustrates a flowchart of a method 200 for differential protection of a transformer under geomagnetically induced current (GIC), in accordance with an embodiment.

At block 202, the harmonic-based GIC detection module 102 receives second harmonic phasors of the differential currents associated with the transformer.

At block 204, the harmonic-based GIC detection module 102 determines phase angles of the second harmonic phasors of the differential currents and, in some cases, passes the phase angles through low pass filters. The harmonic-based GIC detection module 102 processes the filtered phase angles to determine whether the second harmonic phasors are in a negative-sequence format (ABC, considering the counter-clockwise rotation). In other cases, the harmonic-based GIC detection module 102 can receive the values associated with the phase angles.

At block 206, the harmonic-based GIC detection module 102 determines the magnitudes of the second harmonic phasors of the differential currents and determines whether at least one of the magnitudes is greater than a predetermined threshold. In other cases, the harmonic-based GIC detection module 102 can receive the values associated with the magnitudes.

At block 208, the waveform-based GIC detection module 104 receives three-phase instantaneous differential current waveforms associated with the transformer.

At block 210, the waveform-based GIC detection module 104 determines whether the differential current waveforms are all asymmetrical in a positive or negative direction. The waveform-based GIC detection module 104 shifts the waveform of each phase upward or downward, depending on its tracked maximum and minimum values, in order to obtain a completely positive or negative shifted waveform in each cycle. The waveform-based GIC detection module 104 compares the shifted waveform of each phase with a predetermined positive or negative threshold to check whether the waveform is asymmetrical. If the shifted waveforms of three phases are all positive, the waveform-based GIC detection module 104 considers the differential current waveforms to be in a positive direction, and vice versa.

At block 212, either the harmonic-based GIC detection module 102 or the waveform-based GIC detection module 104 (or both) outputs a high (one) GIC signal where the second harmonic phasors are in the negative-sequence format and at least one of the magnitudes is greater than the predetermined threshold, or the differential current waveforms of three phases are all asymmetrical in the positive or negative direction. Otherwise, the output is a low (zero) GIC signal.

At block 214, the supplementary module 106 receives magnitudes of the differential currents with a fundamental frequency and determines rates of change (derivatives) of the differential currents. In some cases, the differential currents derivatives are passed through low pass filters to determine filtered differential currents derivatives.

At block 216, the supplementary module 106 determines if any of the filtered differential currents derivatives are greater than a predetermined supplementary threshold. Where at least one of the filtered differential currents derivatives is greater than the predetermined supplementary threshold, the supplementary module 106 outputs a high (one) supplementary signal; otherwise, the supplementary module 106 outputs a low (zero) supplementary signal.

At block 218, the supplementary module 106 combines the GIC signal with the supplementary signal using NAND logic to output a supplemented GIC signal.

At block 220, the second harmonic blocking module 108 associated with the harmonic-blocked differential element 114 determines a ratio of second harmonic to first harmonic component (the component with the fundamental frequency) of the differential current related to each phase. The second harmonic blocking module 108 outputs a high (one) second harmonic blocking signal if the determined ratio is greater than a predetermined second harmonic threshold; otherwise, the second harmonic blocking module 108 outputs a low (zero) second harmonic blocking signal.

At block 222, the supplemented GIC detection element 116 combines the second harmonic blocking signal with the supplemented GIC signal using AND logic to output a supplemented second harmonic blocking signal.

At block 224, the trip request module 110 associated with the harmonic-blocked differential element 114 determines whether the differential current (with the fundamental frequency) related to any phase is greater than a given current value that is determined based on the restraint current of that phase or a based on a predetermined unrestrained current threshold. The trip request module 110 outputs a high (one) trip request signal (in some cases, with an adjustable time delay) if the differential current related to any phase is greater than the given current value; otherwise, trip request module 110 outputs a low (zero) trip request signal.

At block 226, the trip module 112 associated with the harmonic-blocked differential element 114 combines the trip request signal with the supplemented second harmonic blocking signal, which is passed through NOT logic, using AND logic.

At block 228, the trip module 112 outputs a high (one) trip signal, in some cases with an adjustable time delay, to electrically trip the transformer where the trip request signal is high (one) and the supplemented second harmonic blocking signal is low (zero). Otherwise, the trip module 112 outputs a low (zero) trip signal.

Under such combinations of signals, the GIC signal is ignored if the supplementary signal is low (zero); which keeps the second harmonic blocking signal effective since the supplemented GIC signal is high (one) is such a condition. Otherwise, in the cases of both internal faults and GMDs, both supplementary signal and GIC signal are high (one), resulting in tripping the transformer because the second harmonic blocking signal is overruled by a low (zero) supplemented GIC signal.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for differential protection of a transformer under geomagnetically induced current (GIC), the method comprising:
   receiving differential currents associated with the transformer;
   outputting a high GIC signal where second harmonic phasors of the differential currents are in a negative-sequence format and at least one magnitude of the second harmonic phasors is greater than a magnitude threshold, or waveforms of three phases of the differential currents are all asymmetrical in a positive or negative direction, otherwise outputting a low GIC signal;
   determining derivatives of the differential currents of three phases of the transformer;
   outputting a high supplementary signal where at least one of the derivatives of the differential currents is greater than a supplementary threshold, otherwise outputting a low supplementary signal;
   combining the GIC signal with the supplementary signal using NAND logic to determine a supplemented GIC signal;
   combining the supplemented GIC signal with a second harmonic blocking signal using AND logic to determine a supplemented second harmonic blocking signal; and outputting a trip signal for electrically tripping the transformer based on the supplemented second harmonic blocking signal.

2. The method of claim 1, wherein receiving the differential currents associated with the transformer comprises receiving second harmonic phasors of the differential currents associated with the transformer.

3. The method of claim 1, wherein determining whether the second harmonic phasors of the differential currents are in the negative-sequence format comprises determining phase angles of the second harmonic phasors of the differential currents.

4. The method of claim 3, wherein the phase angles are passed through a low pass filter.

5. The method of claim 1, wherein determining the derivatives of the differential currents of three phases of the transformer comprises determining magnitudes of the differential currents with a fundamental frequency and determining rates of change of the differential currents.

6. The method of claim 5, wherein the derivatives of the differential currents are passed through low pass filters.

7. The method of claim 1, wherein combining the supplemented GIC signal with the second harmonic blocking signal using AND logic to determine the supplemented second harmonic blocking signal comprises:
  determining a ratio of the second harmonic to a first harmonic component of the differential current for each phase, and outputting a high second harmonic blocking signal where the determined ratio is greater than a predetermined second harmonic threshold, the first harmonic component comprising a fundamental frequency;
  combining the second harmonic blocking signal with the supplemented GIC signal using AND logic to output a supplemented second harmonic blocking signal; and
  combining a trip request signal with the supplemented second harmonic blocking signal using AND logic to output the trip signal for electrically tripping the transformer.

8. The method of claim 7, wherein the trip request signal is determined by determining whether the differential current related to any phase is greater than a predetermined current value, and outputting high for the trip request signal when the differential current related to any phase is greater than the predetermined current value, otherwise, outputting low.

9. The method of claim 8, wherein the predetermined current value is determined based on a restraint current of a given phase or a based on a predetermined unrestrained current threshold.

10. The method of claim 8, wherein outputting high for the trip request signal comprises outputting high for the trip request signal after a given time delay.

11. A system for differential protection of a transformer under geomagnetically induced current (GIC), the system comprising electrical circuitry to execute:
  a harmonic-based GIC detection module to receive differential currents associated with the transformer, and output a high GIC signal where second harmonic phasors of the differential currents are in a negative-sequence format and at least one magnitude of the second harmonic phasors is greater than a magnitude threshold, or waveforms of three phases of the differential currents are all asymmetrical in a positive or negative direction, otherwise outputting a low GIC signal;
  a supplementary module to determine derivatives of the differential currents of three phases of the transformer, output a high supplementary signal where at least one of the derivatives of the differential currents is greater than a supplementary threshold, otherwise outputting a low supplementary signal, and combine the GIC signal with the supplementary signal using NAND logic to determine a supplemented GIC signal;
  a second harmonic blocking module to combine the supplemented GIC signal with a second harmonic blocking signal using AND logic to determine a supplemented second harmonic blocking signal; and
  a trip request module to output a trip signal for electrically tripping the transformer based on the supplemented second harmonic blocking signal.

12. The system of claim 11, wherein receiving the differential currents associated with the transformer comprises receiving second harmonic phasors of the differential currents associated with the transformer.

13. The system of claim 11, wherein determining whether the second harmonic phasors of the differential currents are in the negative-sequence format comprises determining phase angles of the second harmonic phasors of the differential currents.

14. The system of claim 13, wherein the phase angles are passed through a low pass filter.

15. The system of claim 11, wherein determining the derivatives of the differential currents of three phases of the transformer comprises determining magnitudes of the differential currents with a fundamental frequency and determining rates of change of the differential currents.

16. The system of claim 15, wherein the derivatives of the differential currents are passed through low pass filters.

17. The system of claim 11, wherein combining the supplemented GIC signal with the second harmonic blocking signal using AND logic to determine the supplemented second harmonic blocking signal comprises:
  determining a ratio of the second harmonic to a first harmonic component of the differential current for each phase, and outputting a high second harmonic blocking signal where the determined ratio is greater than a predetermined second harmonic threshold, the first harmonic component comprising a fundamental frequency;
  combining the second harmonic blocking signal with the supplemented GIC signal using AND logic to output a supplemented second harmonic blocking signal; and
  combining a trip request signal with the supplemented second harmonic blocking signal using AND logic to output the trip signal for electrically tripping the transformer.

18. The system of claim 17, wherein the trip request signal is determined by determining whether the differential current related to any phase is greater than a predetermined current value, and outputting high for the trip request signal when the differential current related to any phase is greater than the predetermined current value, otherwise, outputting low.

19. The system of claim 18, wherein the predetermined current value is determined based on a restraint current of a given phase or a based on a predetermined unrestrained current threshold.

20. The system of claim 18, further comprising electrical circuitry to execute a trip module to electrically trip the transformer where the trip signal is high.

* * * * *